United States Patent
Jain et al.

(10) Patent No.: US 9,681,199 B2
(45) Date of Patent: Jun. 13, 2017

(54) FORECASTING-BASED MANAGEMENT OF ADVERTISEMENT DELIVERY AND INVENTORY

(71) Applicant: Adobe Systems Incorporated, San Jose, CA (US)

(72) Inventors: Anuj Jain, New Delhi (IN); Kumar Mrityunjay Singh, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 133 days.

(21) Appl. No.: 14/067,276

(22) Filed: Oct. 30, 2013

(65) Prior Publication Data

US 2015/0121418 A1   Apr. 30, 2015

(51) Int. Cl.
  *H04N 21/81* (2011.01)
  *H04N 21/237* (2011.01)
  *H04N 21/25* (2011.01)
  *H04N 21/442* (2011.01)
  *H04N 21/458* (2011.01)

(52) U.S. Cl.
  CPC ......... *H04N 21/812* (2013.01); *H04N 21/237* (2013.01); *H04N 21/251* (2013.01); *H04N 21/44204* (2013.01); *H04N 21/44213* (2013.01); *H04N 21/44222* (2013.01); *H04N 21/458* (2013.01)

(58) Field of Classification Search
  CPC ........... H04N 21/812; H04N 21/26603; H04N 21/44008; H04N 21/84; H04N 21/235; H04N 21/24; H04N 21/251; H04N 21/25883; H04N 21/2668; H04N 21/44213
  See application file for complete search history.

(56) References Cited

U.S. PATENT DOCUMENTS

| | | | |
|---|---|---|---|
| 8,255,949 B1* | 8/2012 | Bayer | G06Q 30/0241 725/32 |
| 8,738,446 B1* | 5/2014 | L'Heureux et al. | 705/14.72 |
| 2003/0070167 A1* | 4/2003 | Holtz et al. | 725/32 |
| 2003/0101454 A1* | 5/2003 | Ozer | G06Q 30/02 725/42 |
| 2003/0130887 A1* | 7/2003 | Nathaniel | G06Q 10/02 705/14.73 |
| 2010/0042485 A1* | 2/2010 | Wang et al. | 705/14.5 |
| 2014/0297400 A1* | 10/2014 | Sandholm | 705/14.42 |

* cited by examiner

*Primary Examiner* — Chenea Smith

(74) *Attorney, Agent, or Firm* — Kilpatrick Townsend & Stockton LLP

(57) ABSTRACT

Methods and systems for managing advertisement (ad) delivery and ad inventory for advertisements (ads) placed in video content are provided. An exemplary method receives campaign criteria for a new advertising campaign, the campaign criteria including at least a desired date range. The method then retrieves indications of unsold ad space inventory. In response to determining, based at least in part on the unsold ad space inventory in the desired date range, that the campaign criteria cannot be satisfied, the method: renders, in a user interface, an interactive ad delivery and distribution report indicating forecasted ad distribution and ad delivery for at least part of the desired date range during which the campaign criteria cannot be satisfied; and redistributes ad delivery by adjusting an ad delivery plan based on adjusted report parameters received via the interface in order to accommodate the new advertising campaign.

16 Claims, 6 Drawing Sheets

FORECASTING-BASED MANAGEMENT OF ADVERTISEMENT DELIVERY AND INVENTORY

TECHNICAL FIELD

This disclosure relates generally to computer-implemented methods and systems for delivering advertisements to be placed in video content and more particularly relates to forecasting-based delivery of advertisements and management of advertisement inventories.

BACKGROUND

Video content can be distributed from a provider as video on demand (VOD), time-shifted television, live television, media such as a digital video disc (DVD), motion pictures distributed to theaters as digital video signals, and as electronic content distributed to computing devices. Video content can be broadcast over the air as digital signals, transmitted via satellite, and streamed, downloaded, and uploaded via communications networks such as the Internet.

Given the broad distribution of such video content and growing proliferation of viewing and playback devices for viewing such video content, providers and distributors of video content often employ video-advertising techniques to insert advertisements into video content.

Prior solutions for distributing advertisements for video content require manual steps of a publisher's sales personnel talking to an advertiser to strike deals, and creation of a report containing forecasted future inventory and indicating ads applied to this predicted inventory by an inventory management system (IMS). With traditional techniques, these steps are needed to identify available and unsold ad inventory, and to indicate where the publisher can accommodate an advertiser's campaigns. With existing IMS platforms, computations are required to fulfill each ad's daily budget target.

These prior solutions do not handle situations where sufficient ad inventory is not available on some days of a desired flight duration of an advertiser's new campaign (i.e., a campaign duration representing a time range during which ads of the campaign are to be served by an ad server). In such cases, deals may not go through. Reports generated by existing IMS platforms are static, and as a result, sales personnel cannot interact with the reports to attempt to dynamically re-distribute or re-adjust an ad delivery plan based on a simulation of existing, planned campaigns. As such, existing techniques are often unable to accommodate new campaign requirements of advertisers. As a result, sales personnel and agents may not be able to commit to the needs of advertisers in cases when adjustment/re-distribution of future delivery plans of existing campaigns are required.

Therefore, there is a need for improved ad management technique.

SUMMARY

In one embodiment, a method includes receiving, at a computing device, campaign criteria for a new advertising campaign, the campaign criteria including at least a desired date range. The method then retrieves indications of unsold ad space inventory. In response to determining, based at least in part on the unsold ad space inventory corresponding to the desired date range, that the campaign criteria cannot be satisfied, the method renders, in a user interface, an interactive ad delivery and distribution report, the report indicating ad distribution and ad delivery for at least part of the desired date range during which the campaign criteria cannot be satisfied; and redistributes ad delivery by adjusting an ad delivery plan based on adjusted report parameters received via the interface.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
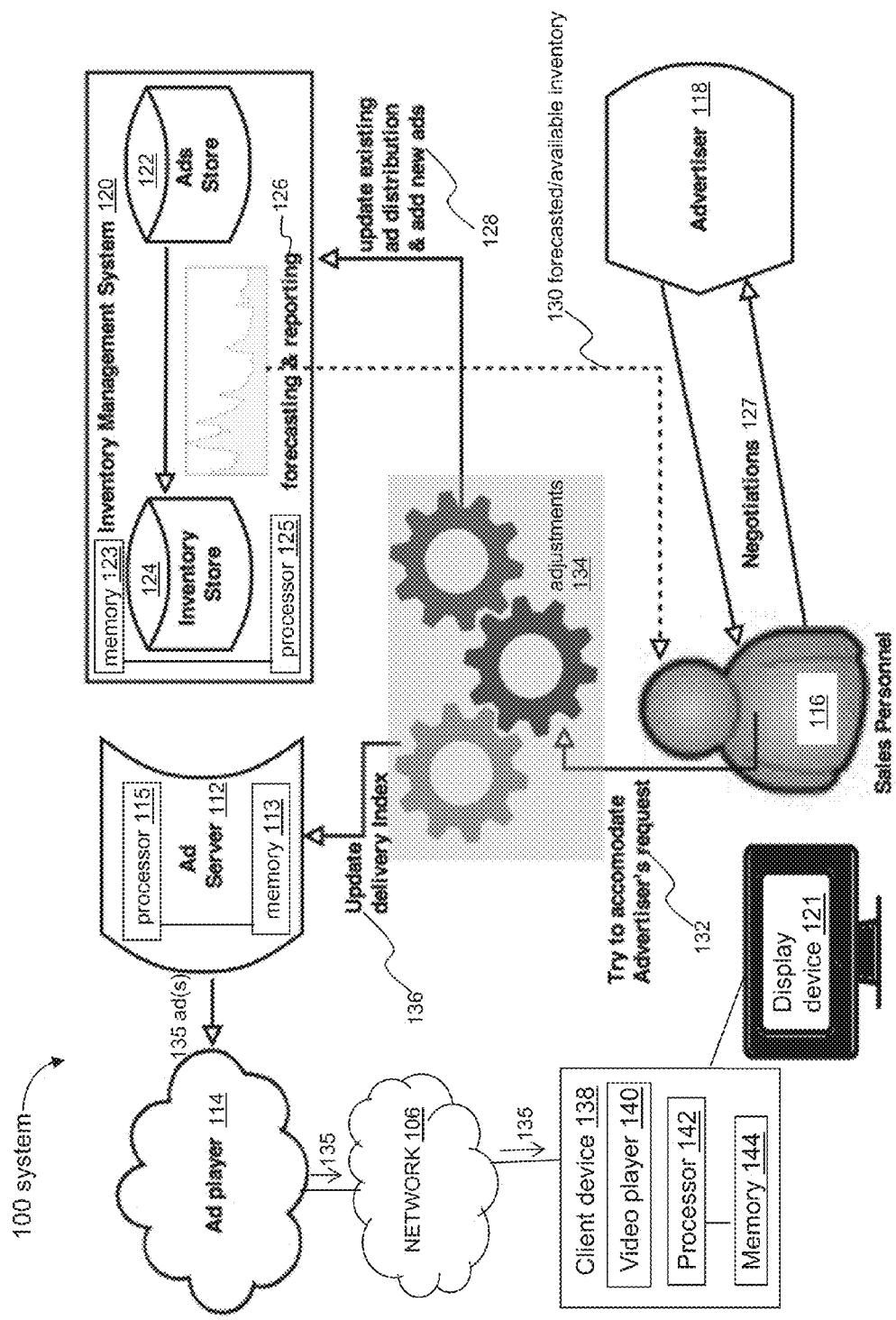
FIG. 1 is a block diagram depicting workflow and components of an ad delivery and inventory management system, in accordance with various embodiments.

Methods and systems are disclosed for managing delivery and inventory of advertisements (i.e., ads) to be placed in video content. Exemplary methods and systems provide forecasting-based management of ad delivery and ad inventories to accommodate new ad opportunities, such as new advertising campaigns.

Embodiments disclosed herein provide mechanisms for adjusting delivery plans of existing ad campaigns in an inventory management system (IMS) in order to accommodate new ad campaign deals between publishers and advertisers, while still honoring commitments made to advertisers regarding the existing campaigns. Certain embodiments can be used in conjunction with advertising servers, systems and platforms such as, for example, the Adobe® Auditude video advertising platform, in order to enable advertising systems and platforms to accommodate new advertising campaign requests by reshuffling existing allotments of campaigns.

Systems and methods are provided for adjusting future as well as current delivery plans for ads. The systems and methods provide mechanisms for dynamically adjusting ad delivery plans of existing advertising campaigns in order to accommodate new campaigns, while simultaneously ensuring that commitments made to advertisers for existing campaigns are honored. The systems and methods take into account certain allowable limits for delivery plan adjustments. In certain embodiments, a system provides a tool that allows sales personnel to adjust delivery plans of competing campaigns. Competing campaigns may overlap in terms of time (i.e., flight duration), targeted demographics (i.e., audience segments), targeted video player characteristics, and/or targeted geographic regions. According to this embodiment, the system accommodates delivery requirements of new campaigns so sales of ad space inventory sought by new campaigns can be negotiated. The system can use an IMS with forecasting and dynamic reporting capabilities.

An exemplary method includes the following operations or steps. An advertiser specifies their request in terms of targeting criteria and budget criteria to a sales person representing a publisher of video content. The targeting criteria can include campaign-related criteria such as, for example, a targeted region, a targeted audience segment, a minimum number of impressions, a date range associated with a campaign, and other campaign-related criteria. The budget criteria can include, but is not limited to, cost per mille/thousand impressions (CPM), cost per click (CPC), and other budget criteria. Next, the sales person generates a dynamic, interactive report from an IMS for a requested date range associated with the advertiser's request and the requested targeting criteria, such as a minimum number of impressions per day set by the advertiser. An example of such a report is provided in FIG. 2 wherein displayed values are adjustable by the sales person to accommodate the advertiser's new campaign.

At this point, based on the adjustable report, the sales person decides if the advertiser's request for the desired date range can be accommodated, given the publisher's unsold inventory. This step can be performed using an IMS to simulate a modified distribution of ads reflecting changes by sales personnel in the adjustable report.

Figure 2:
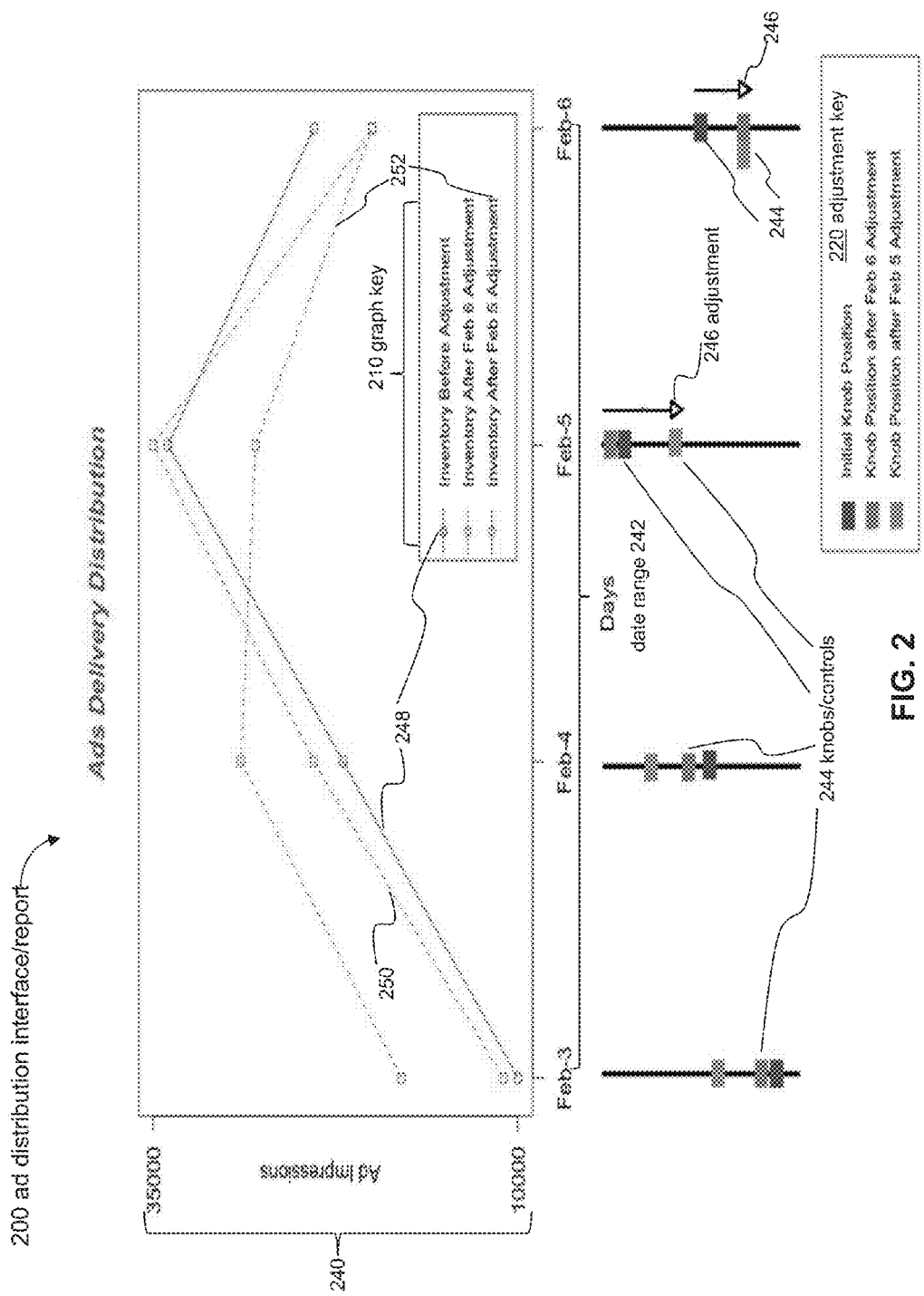
FIG. 2 illustrates an example of an interactive user interface and report for an ad delivery and inventory management system, in accordance with various embodiments.

Next, if is it determined that the campaign goals can be met, an agreement is made (i.e., the sales person and advertiser strike a deal) to book/place the ads and the booked ads are indicated as sold ad inventory in the IMS. This step can result in a deal struck between the sales person and the advertiser. Otherwise, if it is determined that the campaign goals are not met straight away, the sales person can adjust values in the report (i.e., by sliding the virtual knobs 244 shown in FIG. 2 to adjust impressions associated with time increments such as, for example, a day, hour, or week). These adjustments re-distribute delivery of competing campaigns (which overlap in time with the new campaign) in the system, and make more space available on dates with insufficient inventory so that the new campaign can be accommodated. Techniques for carrying out such adjustments as well as exemplary algorithms and equations for redistributing ad delivery triggered by such adjustments are described below with reference to FIG. 2. An example user interface (UI) displaying a dynamic report usable to dynamically adjust ad delivery plans is shown in FIG. 2. The re-distribution performed in this step ensures that commitments for existing campaigns are honored as new, partially overlapping campaigns are accommodated. This step can comprise a sales person examining the dynamic report after adjustments and determining if the new campaign can actually be accommodated.

In certain embodiments, if it is determined, as a result of the above-described adjustments and re-distribution, that the new campaign can be accommodated, a deal is finalized between the sales person and the advertiser. At this point, the new campaign is committed and saved in the system (i.e., the sold ad inventory is indicated in the IMS). In an embodiment, delivery indicators are sent to an ad server so it can immediately start adjusting its ad delivery to conform to the new delivery plan. FIG. 2 provides an exemplary UI including simulation graphs indicating adjusted ad delivery conforming to a new, adjusted ad delivery plan.

According to certain embodiments, if it is determined that the new campaign cannot be accommodated even after adjustments performed via the dynamic report (i.e., moving the knobs 244 of FIG. 2 all the way to an upper or lower limit) due to there being insufficient inventory available in the system, terms of the deal may be re-negotiated between the sales person and the advertiser in light of what portion of the targeting and budget criteria can be accommodated.

One embodiment provides a system that facilitates forecasting-based delivery of ads to be placed into video content. The video content can be online video content obtained from content providers, publishers and distributors. Such online video content can be streaming or downloaded video requested from a website by a video player application executing on a client device. The request from the client device is received at a server associated with a provider's or publisher's web site. Ads are placed in the requested video content based in part on properties of the video content and properties of ads available from ad providers such as advertisers.

Embodiments provide automated and semi-automated methods and systems for delivering ads to be inserted into multimedia assets such as video content. Although exemplary computer-implemented methods and systems are described herein in the context of ad delivery for online video content, it is to be understood that the systems and methods can be applied to place ads within other multimedia assets, such as, but not limited to, video on demand (VOD) assets (i.e., pay-per-view movies and rental assets), subscription video on demand (SVOD) assets, currently-airing or future-scheduled linear broadcast television programs, simultaneous broadcasts (simulcasts), movies shown in theaters, physical media such as digital video discs (DVDs), and software programs such as video games.

Embodiments provide a method and system for delivery of ads to be inserted into video content, the ads having been provided by an advertising network or other ad provider. The method and system can receive indications of the ads via a user interface and ad processing module. An exemplary user interface (UI) can present budget or cost information for placing a given ad in videos within a desired date range, such as a flight duration for a campaign. Costs can also be expressed in terms of monetary or currency amounts. In various embodiments, a monetary cost for placing an ad in a desired type of video during a desired date range can be based at least in part on the size and duration properties of the ad as well as properties of the videos. For example, monetary costs of placing longer-duration and larger-sized ads may be greater than placing relatively shorter-duration or smaller-sized ads in the same videos.

In certain embodiments, the ads can be selected from a plurality of advertisements provided by one or more advertisement networks. In one embodiment, an advertisement network can comprise three general categories of entities: 1) content providers, distributors, and other entities who create and offer video content (collectively "publishers"); 2) ad providers, advertisers, and other entities who are the source of ads (collectively, "advertisers"); and 3) viewers, subscribers, consumers, theaters, and other entities who request, receive, and/or watch video content offered by publishers (collectively, "viewers"). Publishers can be any video content publisher. Examples of publishers include, but are not limited to, television networks, film/movie studios, film distributors, and distributors of online video content such as, for example, Netflix Inc., YouTube from Google Inc., and Dailymotion. Publishers can sell their ad inventories to the advertisers and make commitments with advertisers, such as ad agencies and ad networks. These sales and commitments can be based on the publisher's understanding of the state of inventory of video content and ad placements within the video content in an inventory management system (IMS). Publishers may look at simulations of the future inventory in the IMS and the simulations of how this inventory will be monetized using the existing ads (i.e., sold ads) in the IMS. From these reports, publishers can make informed decisions as to whether an advertiser's new campaigns can be accommodated or not. Embodiments disclosed herein provide means for influencing the delivery plans of existing campaigns in an IMS in order to better accommodate the needs of the new campaigns and make related sales commitments that would otherwise not be able to be accommodated.

An embodiment of the system includes a repository, such as a data store or database, for storing the uploaded advertisements, the video content (or references thereto), and their metadata. An example ads data store 122 is described below with reference to FIG. 1. The metadata can include characteristics and properties of assets such as video content and advertisements. The video content properties can include, but are not limited to, genre/category, rating, duration, color pallette/scheme, resolution, format, language options, captioning options, publisher, cast, director, date/timestamp information, playback restrictions, markers for temporal locations of advertising breaks, compatible/supported rendering/viewing platforms, and other properties of video content. Some video content properties, such as a genre or publisher, can apply to an entire video asset, while other properties are relevant to certain portions or frames of the video asset. For example, metadata useful for inserting advertisements in video content such as cut points, scene changes, opening credits, closing/end credits, and similar information, does not apply to every frame in a given video asset. Similarly, format properties can indicate whether all or a portion of a video asset is two-dimensional (2D) or three-dimensional (3D). Playback restriction properties can include regional or age-based restrictions as well as restrictions on a number of viewings or a time limit for viewing (i.e., for VOD and rented video content). For a rented video asset, a playback restriction property can indicate the length of a video asset rental as a duration (i.e., 24 hours). The compatible/supported rendering/viewing platform properties can indicate minimum requirements for viewing the video content, such as supported resolutions, compatible video players, and supported client device platforms. For example, these properties can indicate a minimum display resolution, display size, operating system (OS) version, and/or player/browser version needed to play the video content.

Some or all of the video content and ad properties can be in the form of metadata included as tags/keywords, data carrying icons, or markers stored within video content and advertisements. For example, the metadata can be included outside of visible areas of frames of the video content and advertisements. Non-limiting examples of metadata for electronic content items can include a title, author, keywords, and the like. Metadata may also describe a relationship between video content and advertisements, such as how the video content and the advertisements can be combined to create renditions of video content including the advertisements. Metadata can also describe when and how an electronic content item was created, such as information identifying application used to create the item, a timestamp, a file type, encryption status, and other technical information for the item, and/or access rights for the item. In certain embodiments, the metadata can include rendering attributes and their values for video content or an advertisement. For example, if a rendering attribute is included in metadata for video content, the metadata can also include a value for that rendering attribute specific to rendering the content via a video player application that the content is to be viewed with. Depending on the encryption status and/or access rights, video content may be transmitted to/from the publisher via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. In additional or alternative embodiments, properties can be stored separately from the ad content in a repository such as ads data store 122, which is described below with reference to FIG. 1.

The ad properties can include, but are not limited to, product/service category, duration, target demographic, target region, color pallette/scheme, translucency, shape, format, size, dimensions, resolution, language options, date/timestamp information, monetary cost per placement, monetary cost per mille/thousand impressions (CPM), number of prior insertions/placements, budget, expiration, and other metadata about the advertisement. The format properties can indicate whether the video content and the advertisement is 2D or 3D. In cases where the format of advertisement is 3D, the dimension property includes a depth of the advertisement. The size and dimension properties can be in terms of pixels. In various embodiments, a number of placements can be expressed as a number of times the advertisement has been inserted in video content and this property, in combination with the monetary cost per placement and/or budget properties, can be used to determine if there is any remaining budget for inserting the advertisement into video content. The expiration property can be embodied as an expiration date in order to determine if an advertisement is still available for insertion into video content. For example, if an advertisement includes time-sensitive information, such as information pertaining to a scheduled event, such as, but not limited to, a sale occurring within a date/time range, a time-sensitive promotion, a product release date, a television program debut, a theatrical movie release, or a temporary offer, the expiration property can be set accordingly so that the advertisement is not inserted into video content after a certain date or time.

According to an embodiment, when a user requests video content offered by a publisher who is a member of the advertisement network, a rendition of the requested content with advertisements from an advertiser in the network is delivered to the user. The user can request the video content via a smart TV, a set top box (STB), or a video player application, such as the exemplary video player 140 described below with reference to FIG. 1. In one embodiment, the user can request and view video content in the video player 140 executing on a client device having a display. The video player 140 can have a video player UI that users can interact with to select, preview, and view video content. The selected video content can be downloaded or streamed to a client device where video player 140 is executing. For example, in the context of online video content, when a user requests video during a visit to a publisher's web site, that user will receive some advertisements. Each of the entities benefits from this process as described below.

The ad provider (i.e., an advertiser, organization, government agency, television network, VOD supplier, or other entity wishing to convey information via an advertisement) can publicize and promote items indicated in advertisements. For example, in embodiments where the ad provider is an advertiser, the advertiser can increase awareness of a service, product or brand offered for sale. As would be understood by those skilled in the relevant art(s), this increased awareness can correspond to increased sales of the service, product, or branded items indicated in the advertisement. In one or more embodiments, ad providers can be video content providers, such as, but not limited to, television networks, web sites, VOD suppliers, and movie/film studios, who wish to place advertisements promoting their television programs, online video content, and films.

The video content provider (i.e., a distributor, publisher, or web-site) can receive revenue from the ad provider for displaying the ad provider's advertisement in video content offered by the video content provider. In turn, this revenue stream can allow video content providers to offer consumers, such as subscribers, and viewers of the video content additional services. These additional services can include more video content, reduced-price (or free content), and/or content with increased quality. Where the video content is provided online as electronic content, increased quality can be embodied as a higher resolution rendition of the video content and/or a rendition of the video content without linear advertisements. In certain embodiments, the revenue stream from advertisements enables video content providers to reduce prices for video content. For example, reduced-price or free renditions of iTunes videos, iTunes apps and games containing video content, pay-per-view video assets such as movies and television programs, Amazon Video On Demand assets, and VOD video content can be offered to consumers. Various embodiments can thus address issues related to tracking and collecting events related to playback of video content and advertisements inserted into the video as a result of resolving an advertisement request. In the examples of FIGS. 1 and 2, an ad server 112 find the most suitable advertisement(s) for video content requested by a client device 138 and then an ad player 114 can retrieve and insert the advertisement(s) into the video content as it is being played in a video player 140. Embodiments address important aspects in online advertising, e.g., collecting event data that can be used to decide what sum an ad provider or advertiser will pay for a selection (i.e., a click) on an interactive advertisement. This can be addressed through a bidding process (e.g., bidding on objects to be placed in video content) and/or by using ad properties pertaining to budget such as monetary cost per placement and/or cost per mille/cost per thousand advertising impressions (CPM) for an advertisement.

As used herein, the term "video content" refers to any type of audiovisual media that can be displayed or played on computing devices via video player applications, television devices, projection television systems, digital video recorder (DVR) devices, DVD devices, game consoles, computer-implemented video playback devices, mobile multimedia devices, mobile gaming devices, and set top box (STB) devices. A STB can be deployed at a user's household to provide the user with the ability to control delivery of video content distributed from a provider. Video content can be electronic content distributed to computing devices via communications networks such as, but not limited to, the Internet.

Video content can be in the form of electronic content streamed from a server system to a web-enabled television (i.e., a smart television), a projection television system, or a client computing device. Streaming electronic content can include, for example, live and on-demand audiovisual content provided using a streaming protocol, such as, but not limited to, Internet Protocol television (IPTV), real-time messaging protocol (RTMP), hypertext transfer protocol (HTTP) dynamic streaming (HDS), HTTP Live Streaming (HLS), and Dynamic Adaptive Streaming over HTTP (MPEG-DASH). A server system can provide multiple renditions of video content having different quality levels and language options, such as captioning or audio dubbing.

One embodiment provides user interfaces (UIs) that publishers, their sales personnel, and advertisers can use to upload video content, ads, and associated metadata into the system. In certain embodiments, references to the video content and ads are provided via the UIs instead of full copies of the content. As used herein, the term "metadata" is used to refer to information associated with (and generally but not necessarily stored with) electronic content items such as video content and ads that provides information about a property of the electronic content item. Metadata may include information uniquely identifying an electronic content item. Such metadata may describe a storage location or other unique identification of the electronic content item. For example, metadata describing a storage location of video content may include a reference to a storage location of a copy of the video content in a server system used by publishers, advertisers, and users. One example of such a reference is a Uniform Resource Locator (URL) identifying the storage location on a web server associated with a publisher's web site. Such references can be provided by publishers as an alternative to uploading a copy of the video content to the system via a publisher UI.

As used herein, a "campaign" refers to a collection of components, such as ads, and rules related to a marketing initiative or promotional effort. A campaign can be defined by an advertiser or ad agency based on who the advertiser wants to reach in terms of certain categories or types of viewers (i.e., audience segments), within a certain time period (i.e., time ranges, date ranges, seasons), within a certain geographic region (i.e., countries), a and/or a certain number of impressions for ads (i.e., a number of times ads in the campaign are served up to video players). Campaigns can include linear ads, overlay ads, and other ads such as, for example, hypervideo ads. Hypervideo advertisements can be embodied as displayed video streams containing embedded, selectable or actionable (i.e., user-clickable) anchors. Ad playback information for such hypervideo advertisements can include events corresponding to a selection or click of an anchor. Negotiations can occur between sales personnel and advertisers who are interested in more than just a number of ad impressions. For example, campaigns may be targeted in part to geographic regions where video content and ads inserted into the video content will be placed. A campaign can include a set of rules defining what instances of components should be shown to whom, and when to show the instances. An exemplary campaign can include a plurality of instances of ads embodied as a set of alternative ads. In certain embodiments, for ads included in a campaign, all ad instances and offers are stored in that campaign along with the rules as campaign data. Various embodiments enable each offer in a campaign to be associated with a specific segment of users of electronic content. According to these embodiments, when a visitor arrives at a web page containing a targeted ad, the ad dynamically selects and displays an appropriate offer according to segment information for the visitor in accordance with rules defined for a campaign including the component. A given set of electronic content can include one or more ad that could be targeted (i.e., targetable ads). In certain embodiments, multiple campaigns can be applicable to that electronic content. According to these embodiments, each of these campaigns can include respective data for all of the variants of the targetable ads (i.e., the experiences) and actual content such as image, video and text assets comprising the ads. Campaign rules determine what will be displayed inside electronic content, such as a web page. Campaign data can include logic (i.e., targeting rules) for determining which ads are to be displayed to certain segments or audiences of users. Campaign data indicates target segments and audiences a campaign is interested in.

A campaign can be time-based. For example, a campaign can be associated with a season (i.e., spring, summer, fall or winter), a range of hours (i.e., 9 AM-6 PM), a date range (i.e., Monday-Friday), or a calendar event such as a holiday. Campaigns can also be geared towards a geographical region, a country, a time zone, or a subset thereof. Campaigns can be developed to promote and sell items during such seasons, time frames, and date ranges in particular regions. For example, a winter campaign can include ads directed to selling winter clothing, winter-relating sporting goods such as ski equipment, and other winter-related products such as snow shovels, snow tires, etc. Also, for example, a summer campaign can include ads related to summer apparel, swimwear, summer-related sporting goods, and other summer-related products such as pool supplies. It is to be understood that additional time-based campaigns can be created for portions of seasons and events such as Olympic Games, World Cup tournaments, tennis tournaments, and other scheduled events. Campaigns can also be created for different regions and countries to promote and sell certain items and services around the occurrence of regional holidays, national holidays, or other calendar events related to a given region or country.

As used herein, the term "advertiser" refers to any potential purchaser or buyer of items from an inventory (i.e., ad slots) from a publisher. Advertisers can be ad agencies or ad networks that supply and delivery ads. As shown in FIG. 1, advertisers can employ an ad server 112 and ad player 114 to deliver ads. Advertisers may make purchase decisions regarding where to place their ads based on their campaign goals and criteria. Advertisers can purchase placement for their ads, which can be stored in ad servers or in ad networks.

As used herein, the terms, "sales personnel," "sales staff," "sales person," "sales persons" and "sellers" refer to any representative of a publisher who negotiates agreements with an advertiser regarding sales of ad inventory items (i.e., ads). Sales personnel are authorized by publishers to strike deals with an advertiser to fulfill the advertiser's campaign goals. The ad sales agreements and deals can be based upon the publisher's available and forecasted unsold ad space inventory. Sales personnel can be human users of the systems, user interfaces, and interactive reports disclosed herein. For example, a salesperson can be an individual who procures ads for the inventories of slots where ads can be placed and sells ad slots, such as a person at any given time selling impressions for ads (where impressions represent how many people end up watching ads). As used herein, the term "impressions" refers to a number of times an ad has been provided for viewing. For example, impressions can represent the number of times an ad has been served up by an ad server for video players.

In various embodiments, an inventory management system (IMS) is a system configured to store a collection of all ads in a system. An IMS can store sold ad inventory, i.e., previously sold ads that are included in the overall inventory of all ads. According to embodiments, an IMS can also store ad inventory available to a publisher at future point in time in future (i.e., future inventory). An exemplary IMS 120 including an ads data store (i.e., ads data store 122), an inventory data store (i.e., inventory database 124), and a forecasting and reporting module 126, is shown in FIG. 1. An example ad inventory forecasting and reporting user interface illustrating future inventory based on the exemplary forecasting-based ad inventory management techniques disclosed herein is provided in FIG. 2. An IMS can be configured to manage publisher inventory and ads booked to be shown on publisher's site as per agreed upon contracts with an advertiser. In an embodiment, an IMS is configured to run simulations to predict future ad inventory states and forecast a publisher's ability to book more ads.

As used herein, the term "ad server" refers to an actual ad delivery system configured to deliver ads to viewers of videos on a website. In various embodiments, an ad server delivers ads to be viewed on a publisher's website. An exemplary prior art ad server 422 is described below with reference to FIG. 4.

An embodiment of the system includes a repository, such as a data store or database, for storing the uploaded ads, the video content (or references thereto), and their metadata. An example ads data store 122 is described below with reference to FIG. 1. The metadata can include characteristics and properties of video content and ads. The video content properties can include, but are not limited to, genre/category, rating, duration, color pallette/scheme, resolution, format, language options, captioning options, publisher, cast, director, date/timestamp information, playback restrictions, markers for linear advertisements, compatible/supported rendering/viewing platforms, and other properties of video content. Some video content properties, such as a genre or publisher, can apply to an entire video asset, while other properties are relevant to certain portions or frames of the video asset. For example, metadata useful for editing or placing ads in video content such as cut points, scene changes, opening credits, closing/end credits, and similar information, does not apply to every frame in a given video asset. Similarly, format properties can indicate whether all or a portion of a video asset is 2D or 3D. Playback restriction properties can include regional or age-based restrictions as well as restrictions on a number of viewings or a time limit for viewing (i.e., for VOD and rented video content). For a rented video asset, a playback restriction property can indicate the length of a video asset rental as a duration (i.e., 24 hours). The compatible/supported rendering/viewing platform properties can indicate minimum requirements for viewing the video content, such as supported resolutions, compatible video players, and supported client device platforms. For example, these properties can indicate a minimum display resolution, display size, operating system (OS) version, and/or browser version needed to view the video content.

Some or all of the video content properties can be in the form metadata included as tags/keywords, data carrying icons, or markers stored within the video content. For example, the metadata can be included outside of visible areas of frames of the video content. Non-limiting examples of metadata for electronic content items can include a title, author, keywords, and the like. Metadata may also describe a relationship between video content and ads, such as how the video content and the ads can be combined to create edited video content including the ads. Metadata can also describe when and how an electronic content item was created, such as information identifying application used to create the item, a timestamp, a file type, encryption status, and other technical information for the item, and/or access rights for the item. In certain embodiments, the metadata can include rendering attributes and their values for video content or an ad. For example, if a rendering attribute is included in metadata for video content, the metadata can also include a value for that rendering attribute specific to rendering the content via a video player application that the content is to be viewed with. Depending on the encryption status and/or access rights, video content may be transmitted to/from the publisher via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. In additional or alternative embodiments, properties can be stored separately from the ad content in a repository such as ads data store 122 or ad space inventory data store 124, which are described below with reference to FIG. 1.

The ad properties can include, but are not limited to, product/service category, duration, target demographic, target region, color pallette/scheme, translucency, shape, format, size, dimensions, resolution, language options, date/timestamp information, monetary cost per placement, number of prior insertions/placements, budget, expiration, and other metadata about the ad. The format properties can indicate whether the video content and the ad is 2D or 3D. In cases where the format of ad is 3D, the dimension property includes a depth of the ad. The size and dimension properties can be in terms of pixels. In cases where an ad is an advertisement, a number of placements can be expressed as a number of times the advertisement has been inserted in video content and this property, in combination with the monetary cost per placement and/or budget properties, can be used to determine if there is any remaining budget for inserting the advertisement into video content. The expiration property can be embodied as an expiration date in order to determine if an ad is still available for insertion into video content. For example, if an ad includes time-sensitive information, such as information pertaining to a desired date range of a campaign, a flight duration for a campaign, a scheduled event, such as, but not limited to, a sale occurring within a date/time range, a time-sensitive promotion, a product release date, a television program debut, a theatrical movie release, or a temporary offer, the expiration property can be set accordingly so that the ad is not inserted into video content after a certain date or time.

According to an embodiment, when a user requests video content offered by a publisher who is a member of the advertisement network, a rendition of the requested content with advertisements from an advertiser in the network is delivered to the user. The user can request the video content via a smart TV, a set top box (STB), or a video player application, such as, for example a browser. In one embodiment, the user can request and view video content in the video player executing on a client device having a display.

The video player can have a video player UI that users can interact with to select, preview, and view video content. The selected video content can be downloaded or streamed to a client device where video player is executing. In the context of online video content, when a user requests video during a visit to a publisher's web site, that user will receive some advertisements. Each of the entities involved in the exemplary processes described here are described below.

An ad provider (i.e., an advertiser, ad network, adverting agency, organization, or other entity wishing to convey information via an ad) can publicize and promote items indicated in ads. For example, in embodiments where the ad provider is an advertiser, the advertiser can increase awareness of a service, product or brand offered for sale. As would be understood by those skilled in the relevant art(s), this increased awareness can correspond to increased sales of the service, product, or branded items indicated in the advertisement. In one or more embodiments, ad providers can be video content providers, such as, but not limited to, television networks, web sites, and movie/film studios, who wish to place advertisements promoting their television programs, online video content, and films.

The video content provider (i.e., a distributor, publisher, or web-site) can receive revenue from the ad provider for displaying the ad provider's ad in video content offered by the video content provider. In turn, this revenue stream can allow video content providers to offer consumers, such as subscribers, and viewers of the video content additional services. These additional services can include more video content, reduced-price (or free content), and/or content with increased quality. Where the video content is provided online as electronic content, increased quality can be embodied as a higher resolution rendition of the video content and/or a rendition of the video content without linear advertisements. In various embodiments, the revenue stream from ads enables video content providers to reduce prices for video content. For example, reduced-price or free renditions of iTunes videos, iTunes apps and games containing video content, pay-per-view video assets such as movies and television programs, Amazon Video On Demand assets, and VOD video content can be offered to consumers. An embodiment avoids placement of poorly targeted ads having little relevance to a group of consumers viewing video content. Another embodiment avoids placing obtrusive or intrusive ads which may cause a viewer to ignore the ads or even choose competitor web-sites that offer the services they need. Furthermore, this kind of ad can have a negative impact in the way the advertiser is perceived.

Aspects that can be addressed in online advertising include deciding what sum an ad provider or advertiser will pay for a selection (i.e., a click) on an interactive ad or advertisement. This can be addressed through a bidding process (e.g., bidding on objects to be placed in video content) and/or by using ad properties pertaining to budget and monetary cost per placement.

As used herein, the term "video content" refers to any type of audiovisual media that can be displayed or played on television devices, projection television systems, digital video recorder (DVR) devices, DVD devices, game consoles, computer-implemented video playback devices, mobile multimedia devices, mobile gaming devices, and set top box (STB) devices. A STB can be deployed at a user's household to provide the user with the ability to control delivery of video content distributed from a provider. Video content can be electronic content distributed to computing devices via communications networks such as, but not limited to, the Internet.

Edited video content including unobtrusive ads placed by the exemplary systems and methods disclosed herein can be previewed, selected and viewed by various video player devices and platforms used to select and view video content. Such devices can be components of platforms including personal computers, smart phones, personal digital assistants (PDAs), tablet computers, laptops, digital video recorders (DVRs), remote-storage DVRs, interactive TV systems, and other systems capable of receiving and displaying video content and/or utilizing a network connection such as the Internet. An exemplary interactive TV system can include a television communicatively coupled to set top box (STB). An exemplary STB client device can include, without limitation, an Internet Protocol (IP)-based (i.e., IPTV) STB. References to a client device or video player should therefore be interpreted to include these devices and other similar systems involving display of video content and viewer input.

As used herein, the term "electronic content" refers to any type of media that can be rendered for display or played on mobile and other computing devices. Computing devices include client and server devices such as, but not limited to, servers, desktop computers, laptop computers, smart phones, video game consoles, smart televisions, tablet computers, portable gaming devices, personal digital assistants, etc. Electronic content can be streamed to, downloaded by, and/or uploaded from computing devices. Electronic content can include multimedia hosted on websites, such as web television, Internet television, standard web pages, or mobile web pages specifically formatted for display on computing devices. Electronic content can also include application software developed for computing devices that is designed to perform one or more specific tasks at the computing device.

Video content can be in the form of electronic content streamed from a server system to a web-enabled television (i.e., a smart television), a projection television system, or a client computing device. Streaming electronic content can include, for example, live and on-demand audiovisual content provided using a streaming protocol, such as, but not limited to, Internet Protocol television (IPTV), real time messaging protocol (RTMP), hypertext transfer protocol (HTTP) dynamic streaming (HDS), and HTTP Live Streaming (HLS). A server system can provide multiple renditions of video content having different quality levels and language options, such as captioning or audio dubbing.

Computer-implemented systems and methods are disclosed for placing ads in unobtrusive locations within video content. In certain embodiments, ads can include text or multimedia content, such as, but not limited to, advertisements. An interactive user interface (UI) for an application executed at a client device can be used to select from among suggested locations for ad delivery and inventory management.

As used herein, the term "electronic content" is used to refer to any type of media that can be rendered for display or use at a computing system, television, client computing device, or other electronic device. Electronic content can include text or multimedia files, such as images, video, audio, or any combination thereof. Electronic content can be delivered as streaming video and as downloaded data in a variety of formats, such as, for example, a Moving Picture Experts Group (MPEG) format, an Audio Video Interleave (AVI) format, a QuickTime File Format (QTFF), a DVD format, an Advanced Authoring Format (AAF), a Material eXchange Format (MXF), and a Digital Picture Exchange (DPX) format. Electronic content can also include application software that is designed to perform one or more specific tasks at a computing system or computing device.

As used herein, the term "rendition" is used to refer to a copy of an asset, such as video content, provided to a video player or client device. Different renditions of electronic content can be encoded at different bit rates and/or bit sizes for use by client devices accessing electronic content over network connections with different bandwidths. When the electronic content includes video content, different renditions of the video content can include different ads for viewing on client devices located in different regions. For example, a video asset can include multiple renditions of the video as separate video clips, where each rendition has a different quality level associated with different bit rates.

As used herein, the term "asset" is used to refer to an item of electronic content included in a multimedia object, such as text, images, videos, or audio files. As used herein, the term "image asset" is used to refer to a digital image included in a multimedia object. One example of an image asset is an ad. As used herein, the term "video asset" is used to refer to a video file included in a multimedia object. Video content can comprise one or more video assets. As used herein, the term "text asset" is used to refer to text included in a multimedia object. Exemplary ads can be embodied as a text asset, an image asset, a video asset, or a combination of text, image, and/or video assets. For example, ads can include a text asset such as a name of a company, product, or service, combined with an image asset with a related icon or logo. Also, for example, ads can include video assets with animation or a video clip.

For simplicity, the terms "multimedia asset," "video asset," "online video content," and "video content" are herein to refer to the respective assets or contents regardless of their source (i.e., publisher), distribution means (i.e., web site, broadcast, simulcast or theatrical release), format (i.e., MPEG, high definition, 2D, 3D), or playback means (i.e., television, client computing device, video player, projection system, DVD player) used to view such files and media. For example, where the publisher of a video asset is a television network, movie/film studio, or production company, the video asset can be a television program or motion picture. Renditions of this video asset can be embodied as streaming or downloadable online video content available from a web site of the publishers or a distributor's web site. Another rendition of the video asset can also be made available as video content on media such as a DVD, a DVR recording, or VOD obtained via an STB and viewed on a television.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Exemplary System Implementation and Workflow

Referring now to the drawings, FIG. 1 is a block diagram depicting an example workflow and components for an ad delivery and inventory management system 100 implementing certain embodiments. As shown in FIG. 1, system 100 includes an inventory management system (IMS) 120, an ad server 112, and a client device 138. IMS 120 includes three main components, namely, ad ads data store 122, an ad space inventory data store 124 and a forecasting and reporting module 126. A publisher server (not shown) can include modules for video processing. Ad server 112 can implement, using processor 115 and memory 113, an ad processing module and a video-ad matching module (not shown). Embodiments of the ad server 112 and IMS 120 in FIG. 1 can be configured to deliver any type of ad, including, but not limited to, linear ads, overlay ads, and hypervideo ads, to any type of video content, including, but not limited to, online video.

In the context of FIG. 1, an advertiser 118 represents a potential buyer of ad inventory from a publisher based on the advertiser's campaign goals and criteria. The sales personnel 116 shown in FIG. 1 can be any representative of a publisher who, via negotiations 127, strikes a deal with advertiser 118 to fulfill the advertiser's campaign goals based upon the publisher's available/forecasted inventory 130. As shown, available and forecasted ad space inventory 130 can be obtained from forecasting and reporting module 126 of IMS 120. Although only a single advertiser 118 is shown in FIG. 1, it is to be understood that system 100 can deliver ads 135 and manage ad inventories associated with campaigns for a plurality of advertisers 118. Similarly, in embodiments, sales personnel 116 representing multiple publishers can perform negotiations 127 with multiple advertisers 118 and can make adjustments 134 to delivery indices 136 for campaigns associated with these multiple advertisers 118. Additional details regarding how adjustments 134 are made are described below with reference to FIG. 2 (see, e.g., adjustments 246).

IMS 120 can store, in ads data store 122, a collection of all ads 135 in system 100. As shown, IMS can also store sold ad space inventory in inventory data store 124. For example, inventory data store 124 can be implemented as a database storing indications of ad time slots in video content and placements of ads in different days (i.e., ad distribution) needed to satisfy requirements of all existing campaigns. Inventory data store 124 can also store available and unsold inventory that a publisher has available at a point in time in the future (i.e., future ad space inventory). The forecasted, future inventory can be determined using the forecasting and reporting module 126 shown in FIG. 1. According to embodiments, IMS 120 is configured to manage publisher inventory and ads booked to be shown on publishers' web sites as per previously agreed upon contracts with advertiser 118.

By performing ad delivery adjustments 134 using forecasted/available inventory 130, system 100 enables sales personnel 116 to run simulations to predict future inventory state and a publisher's ability to book more ads 135 (i.e., ads associated with a new campaign from advertiser 118).

In the example embodiment of FIG. 1, ad server 112 is configured as an actual ad delivery system, that together with ad player 114, delivers ads 135 to viewer players 140 of client devices 138 used to view videos on a publisher's website. Negotiations 127 can be embodied as electronic or other communications between sales personnel 116 and advertiser 118 needed to strike a deal. Once a deal is struck (i.e., an agreement is reached), system 100 creates a report containing forecasted future inventory and a simulation of ads applied on this predicted inventory from IMS 120. This report can enable sales personnel 116 to identify available/unsold ad space inventory, where the publisher can accommodate advertiser's campaigns.

In one embodiment, IMS 120 attempts to fulfill each ad's daily budget target, which can be computed using uniform distribution over a total target), given inventory forecast output by forecasting and reporting module 126. An embodiment of IMS 120 provides a tool that allows the sales person 116 to make adjustments 134 to a delivery plan of competing campaigns in system 100 in order to accommodate delivery requirements of new campaigns as indicated in negotiations 127 exchanged with advertiser 118. Competing campaigns are campaigns that overlap in time (i.e., overlapping flight durations). Competing campaigns can also overlap in terms of sought after viewer demographics, video player 140 characteristics, and/or a geographic region associated with targeted client devices 138.

Although only a single client device 138 is shown in FIG. 1, it is to be understood that system 100 can deliver ads 135 to a plurality of client devices 138. For example, video content including advertisements 135 served by the exemplary ad server 112 and inserted by the exemplary ad player 114 shown in FIG. 1 can be previewed, selected and viewed by various video player applications 140, client devices 138 and platforms used to select and view video content. Such devices 138 can be components of platforms including personal computers, smart phones, personal digital assistants (PDAs), tablet computers, laptops, digital video recorders (DVRs), remote-storage DVRs, interactive TV systems, and other systems capable of receiving and displaying video content and/or utilizing a network connection such as the Internet. As shown in FIG. 1, a client device can receive ads 135 via network 106. An exemplary interactive TV system can include a television or other display device communicatively coupled to set top box (STB). With reference to FIG. 1, exemplary client device 138 can include, without limitation, a display device 121 and an Internet Protocol (IP)-based (i.e., IPTV) STB. Another exemplary client device 138 can be embodied as a tablet computing device, and yet another exemplary client device 138 can be embodied as a smartphone. References to a client device or video player 140 should therefore be interpreted to include these devices and other similar systems involving display of video content and viewer input.

With continued reference to FIG. 1, system 100 can be used to perform the following workflow for forecasting-based ad delivery and inventory management. The workflow begins when advertiser 118 specifies a request to accommodate a new campaign. The request includes a desired date range, targeting criteria, and budget criteria communicated via negotiations 127 with sales personnel 116. Exemplary budget criteria can include CPM values for ads included in a new campaign.

At this point, a sales person 116 can generate a report from IMS 120, such as, for example, the exemplary report shown in FIG. 2 that is adjustable by sales person 116. Adjustments 134 can be based on an indication of changes 132 to accommodate the new campaign. The adjustments 134 can be for a requested date range and the requested targeting criteria. One example of targeting criteria includes a minimum impressions set by advertiser 118.

Next, based upon analyzing the report, the sales person 116 decides if the advertiser's request for the desired date range can be accommodated, given the publisher's unsold inventory. If the request from advertiser 118 cannot be accommodated, adjustments 134 to an existing ad distribution can be made by sales personnel 116. As shown, adjustments 134 can be based on step 132 where sales personnel 116 attempt to accommodate an advertiser's request. Step 132 and its corresponding adjustments 134 to ad distribution and ad delivery can trigger workflow step 128, where an updated ad distribution with new ads is sent to IMS 120 after changes by sales person 116. That is, adjustments 134 can result in new ads 135 being added to an updated ad distribution sent to IMS 120. Then, if the campaign goals of existing campaigns and the new campaign can be met, sales person 116 and advertiser 118 strike the deal and the ads 135 are booked in IMS 120. In this case, an updated ad delivery index 136 is sent to ad server 112. Otherwise, if the campaign goals are not met straight away, sales person 116 can perform additional adjustments 134 (i.e., by making adjustments 246 using controls/knobs 244 shown in FIG. 2. This re-distributes the delivery of competing campaigns in system 100. The re-distribution makes sure that the commitments for the existing campaigns are honored even after adjustments 134 are made. The sales person 116 can look at the report after adjustments 134 to determine if the new campaign can actually be accommodated.

Finally, if it is determined that the new campaign can be accommodated, the deal is finalized and the new campaign is committed (i.e., saved) to system 100. This results in an updated delivery index 136 being sent to ad server 112. In an embodiment, updated delivery index 136 includes delivery indicators sent to ad server 112 so that it can immediately start adjusting its ad delivery to conform to the new delivery plan.

In one embodiment, if the new campaign cannot be accommodated even after repeating adjustments 134, sales person 116 can infer that there is not sufficient ad space inventory available in IMS 120. At this point, terms of the deal with advertiser 118 may need to be re-negotiated by repeating negotiations 127.

In one embodiment, IMS 120 and ad server 112 are components of a platform where publishers can upload video content such as their video assets, advertisers upload ads 135, and viewers (i.e., end-users or 'consumers' of video content who view video assets) retrieve renditions of video content in video players 140 with ads inserted. For each ad 135 in ads data store 122, an ad processing module on ad server 112 can extracts information about the ad 'offline' after an advertiser 118 uploads it via an advertiser UI. A non-limiting example of the extracted information includes the color palette/scheme of the ad. In this embodiment, a video-ad matching module on ad server 112 automatically handles ad selection and placement. In an alternative embodiment, ad selection may be done externally on a remote system or server through a bidding process where an ad provider or advertiser 118 specifies how much he would pay to have his ad shown in certain video content. According to this alternative embodiment, the bidding and ad selection can be based at least in part on a profile of a viewer who selects the particular video content for viewing within a video player.

The ad player 114 can be configured to select a rendition of ads deemed relevant to a region or physical location of a client device 138 a video player 140 or viewer application is executing on. For example, advertisements 135 for tobacco or alcohol products will not be deemed relevant to countries or locations where such advertising is restricted.

The users of the ad delivery and inventory management system 100 can include sales personnel 116 selling ad space on behalf of video content publishers, advertisers 118, and viewers of video content (and delivered ads 135) executing video player 140 on client device 138. Once a publisher uploads video content via a publisher UI, the video content is received by IMS 120, and a video processing module (not shown) performs various computations in order to be able to quickly retrieve the video content and its properties when necessary. A publisher UI can allow a publisher to add new video content, along with metadata, such as, but not limited to, a brief description, title, and tags/keywords for the uploaded video content. The keywords inserted via a publisher UI can be used for video-ad matching on ad server 112 to selecting appropriate ads. These keywords can also represent an essential element for which ad providers such as advertisers may bid on when identifying video content that they want to place their ads into.

A video processing module on IMS 120 can read metadata for the received video content that applies to the entire video in order to categorize the content. For example, genre, resolution, format, access-control, rating and duration properties of the received video content can be indexed and stored in an ads data store 122 with a reference to the video content so that the videos having a certain category can be quickly retrieved from ads data store 122 as needed. In various embodiments, when ad server 112 needs to match an ad 135 that is appropriate to a certain type of video segment, the video properties data stored in ad space inventory data store 124 by IMS 120 can be used to quickly locate clips within video content matching the desired criteria. For example, video-ad matching module on ad server 112 can match ads appropriate for a high definition 3D sports video clip having a duration of less than 5 minutes that is rated for viewing on a video player in a certain region by a viewer in a given age group to video content meeting these criterion using ad and video properties data stored in ads data store 122. IMS 120 can also read and store more granular metadata for uploaded video content that does not apply to every segment, portion or frame of the video content. Such granular metadata can, for example, can pertain to properties useful for ad delivery and inventory management 100 and video editing such as indications of frames including cut points or scene changes.

With continued reference to FIG. 1, an advertiser 118 can interact with an advertiser UI (not shown) to upload an ad 135 to ad server 112. In an embodiment, an advertiser UI consists of a form that allows an advertiser 118 to upload a new ad, along with ad properties, such as keywords representing the desired context or video content in which the ad should appear. Ads uploaded via an advertiser UI can be interactive in that they can include a selectable hyperlink with a target URL that a viewer can click on while playing video content including the ad. For such interactive ads, the ad properties entered via an advertiser UI can include the target URL associated with a supplier of a product, brand, or service indicated in the interactive ad. For example, a viewer, using an input device, can interact with a video player to click on an interactive ad in order to navigate to the target URL in a new browser tab, window or session. After an ad has been added using an advertiser UI, metadata with properties (i.e., features) of the uploaded ad can be extracted by system 100, which then stores the extracted ad properties are stored in ads data store 122.

A viewer can preview, select, and watch videos, along with the inserted ads using a video player. In one embodiment, a video player 140 is embodied as a video content web site that allows visitors to the web site to navigate, browse, and search a list of videos. Video player 140 allows a viewer to select video content from the list of videos and view the selected content. Delivery of the selected video content together with its inserted ads can be accomplished via streaming, downloading, or pushing (i.e., podcasting) the content to a video player. A non-limiting example of a video player is a browser application. When a viewer requests video content to be viewed on video player, the video and ad properties data previously stored in ads data store 122 can be used by ad server 112 and ad player 114 to rapidly match the requested video with the corresponding ads, and to identify a good location to place the matched ads.

Embodiments can provide a viewer application, such as video player 140 shown in FIG. 1, with different renditions of electronic content being rendered for display or use at a client device based in part on a geographic region or location the client device is associated with. Dynamically switching between different versions of video content can provide the most-relevant rendition based on ads placed within the video content and a region or location of the client device accessing the electronic content via a data network. In certain embodiments, ads can be placed using the ad server 112 and ad player 114 shown in FIG. 1. A viewer application can download, stream, or otherwise access electronic content via a network. The viewer application can submit a request to preview of view video content to a server having a server-side ad delivery and inventory management system 100 or module. The ad delivery and inventory management system 100 can create a rendition of the requested video content having non-obtrusively placed ads determined to be relevant to a location or region associated with the client device the viewer application is executing on. For example, an embodiment can select a rendition of electronic content with ads having audio and/or text in English in response to determining that a client device the viewer application is executing on is located in the United States. In various embodiments, such location information and/or language preferences can be user-selected. In other embodiments, the location information can be determined automatically based on a Global Positioning System (GPS) location of the client device, a media access control address (MAC address) of the client device, a network address of the client device, or other identifying information.

The ad delivery and inventory management system 100 can be implemented as one or more modules configured to execute on an ad server (see, e.g., ad server 112) or other computing device. The ad delivery and inventory management system 100 can apply one or more placement rules to place ads in locations within video content. The locations in video content to be downloaded or otherwise accessed by the viewer application can be based in part on properties of the video content and the ad. The cost information can be based on the size, prominence, and duration of the ad to be placed in the video content. The cost information can vary based on differing quality of renditions available from a video content provider.

As shown in FIG. 1, IMS 120 includes a processor 125 coupled to a memory 123, ad server 112 includes a processor 115 coupled to a memory 113, and client device 138 includes a processor 142 coupled to a memory 144. In one embodiment, ad server 112 may be a single computing system. In another embodiment, ad server 112 may be a virtual server implemented using multiple computing systems or servers connected in a grid or cloud computing topology. As described below with reference to FIG. 6, processor 115 may each be a single processor in a multi-core/multiprocessor system. Such a system can be configured to operate alone with a single server, such as server 112, or in a cluster of computing devices operating in a cluster or server farm.

With continued reference to FIG. 1, ads 135 sent to ad player 114 from ad server 112 can be delivered to client device 138 via a network 106. Network 106 may be a data communications network such as the Internet. In one or more embodiments, network 106 can be one of or a combination of a cable network such as Hybrid Fiber Coax, Fiber To The Home, Data Over Cable Service Interface Specification (DOCSIS), Internet, Wide Area Network (WAN), WiFi, Local Area Network (LAN), ATM or any other wired or wireless network. System 100 may store and stream video content including but not limited to online video, television programs, television broadcasts/simulcasts, movies, and video games.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application can access data packets addressed to the port.

Another embodiment of a video-ad matching criterion can be a video content utilization rule. The video-ad matcher can apply the video content utilization rule to generate a recommendation based on how the video content is being rendered for display in video player 140 at client device 138. In one embodiment, the video content utilization rule can describe a size of a window in which video content is being rendered for display, where the described window size is relative to the size of the display device or screen associated with a client device where the video player is executing. For example, applying a video content utilization rule may generate a higher recommendation for a viewer application rendering video content for full-screen display at a client device. A lower recommendation for a full-screen display may produce pixeling/pixilation of the video content and included ads. To this end, a lower recommendation on larger displays and a higher recommendation on smaller displays may be as detrimental to user experience as having insufficient screen size for an ad to be legible on a display of the client device. In another embodiment, the video content utilization rule can describe a type of display device for which the client device renders the electronic content. Electronic content rendered for display or use at a first display device 121 included in or in communication with client device 138 can result in a first recommendation. Video content rendered for display or use at a second display device (not shown) included in or in communication with the client device can result in a second recommendation. For example, a lower recommended bit rate can be generated for video content being rendered for display or use by a client device using a low resolution screen, such as the screen of a tablet computer, and a higher recommended bit rate can be generated for electronic content being rendered for display or use by the client device using a high resolution display device, such as a high-definition television coupled to the tablet computer via a high-definition multimedia interface (HDMI) output.

The ad delivery and inventory management system 100 can store ad data in a database such as ads data store 122 and organize the ad data based on a number of placements for each ad, 135, an ad category, duration, remaining budget, and/or remaining number of placements.

Exemplary User Interfaces and Reports

Figure 3:
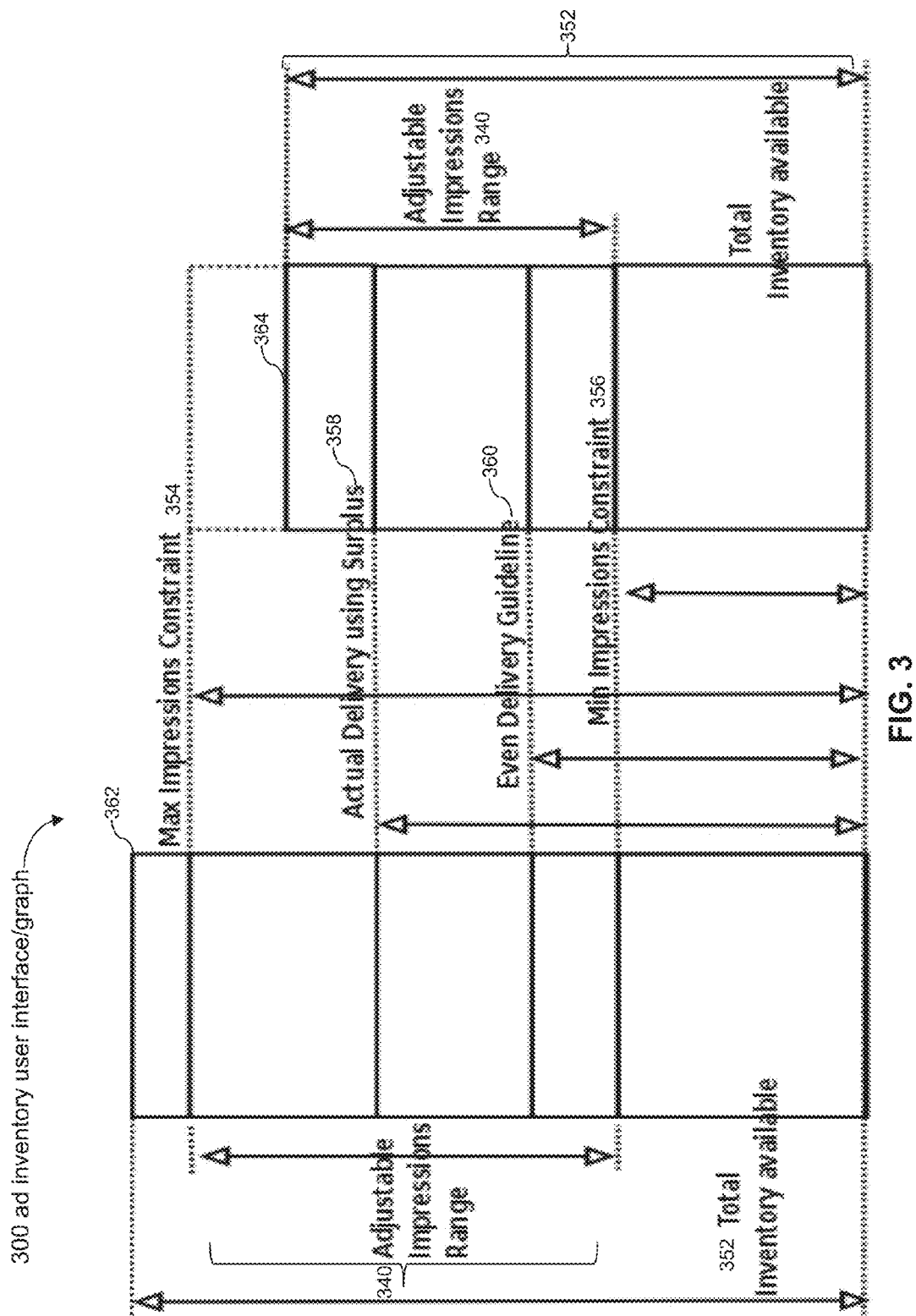
FIG. 3 illustrates levels of available and unsold ad inventory that can be used for ad delivery and distribution, in accordance with various embodiments.

FIGS. 2 and 3 illustrate exemplary ads delivery distribution and administrator user interfaces (UIs), according to embodiments of the present disclosure. The UIs depicted in FIGS. 2 and 3 are described with reference to the embodiments of FIG. 1. However, the UIs are not limited to those example embodiments. The UIs can be displayed on client devices on a display device 121 as shown in FIG. 1.

In FIGS. 2 and 3, displays are shown with various icons, command regions, windows, slider controls, virtual knobs, toolbars, menus, and buttons that are used to initiate action, invoke routines, adjust ad delivery schedules, select date ranges, adjust ad impressions, redistribute ad delivery by adjusting ad delivery plans, or invoke other functionality. The initiated actions include, but are not limited to, updating ad delivery, updating ad distribution for a time increment (i.e., a day), selecting date ranges to simulate, and other ad delivery and inventory management related inputs. For brevity, only the differences occurring within the figures, as compared to previous or subsequent ones of the figures, are described below.

In one or more embodiments, the user interfaces shown in FIGS. 2 and 3 may be displayed via the display interface 602 and the computer display 630 described below with reference to FIG. 6. In certain embodiments, the UIs can be configured to be displayed on a touch screen display device. According to embodiments, a publisher, advertiser, and/or sales person can interact with the UIs shown in FIGS. 2 and 3 using input devices such as, but not limited to, a stylus, a finger, a mouse, a keyboard, a keypad, a joy stick, a voice activated control system, or other input devices used to provide interaction between a user and the UIs. As described below with reference to FIGS. 2 and 3, such interaction can be used to indicate an ad delivery plan to be adjusted or a parameter of an ad distribution to be adjusted.

FIG. 2 illustrates an exemplary, interactive, dynamic ads delivery distribution interface. In one embodiment, publishers, their sales personnel 116 and advertisers 118 can be provided with certain administrator privileges in ad delivery and inventory management system 100 and are granted access to respective portions of user interface 200. After providing login credentials and authenticating to the ad delivery and inventory management system 100, sales personnel 116 can launch the ad distribution user interface (UI) 200. As seen in FIG. 2, ad distribution UI 200 includes graph key 210 for graphs 248, 250 and 252, which are plotted with respect to an x-axis representing ad impressions 240 and a y-axis representing a date range 242. In one or more embodiments, date range 242 represents a range of time increments, such as days, that are included in the a flight duration or desired date range for a campaign. By selecting, using an input device, knobs/controls 244 (embodied as slider UI elements in the example of FIG. 2), sales personnel 116 can render adjusted ad delivery graphs 248, 250, 252. For example, sales personnel 116 can select a portion of the date range 242, i.e., a day) to adjust ad delivery for that portion. Adjustments 246 performed via knobs 244 can be conceptualized as dynamic changes made to parameters of the ad delivery distribution reports and graphs presented in ad distribution UI 200.

In FIG. 2, the total impressions 240 delivered remain the same for all ad delivery graphs 248, 250, 252. Only the actual impressions 240 delivered on specific portions or within specific time increments (i.e., days) within the date range 242 are adjusted to according to user selections of locations for knobs 244. The movement of knobs 244 for particular days makes adjustments 246, which can be graphically depicted to see if such adjustments 246 will accommodate for requirements of new campaigns. In FIG. 2, the adjustments 246 are depicted as directional arrows on the knobs 244 to indicate the movement done by users such as sales personnel 116. In the example of FIG. 2, graph 248 represents the inventory and ad impressions for each time increment (i.e., days) within date range 242 before knobs 244 are moved to make adjustments 246. When adjustments 246 are made to time increments (e.g., February 5 and 6 in the example of FIG. 2), graphs 250 and 252 can be rendered to show an adjusted ad delivery schedule, in terms of ad impressions 240, for those time increments. In order to ensure that adjustments 246 do not violate commitments related to existing campaigns, adjustments 246 within date range 242 are bounded or constrained such that the total sum of ad impressions 240 for time increments in date range 242 equal the total ad impressions 240 represented by graph 248. In this way, adjustments 246 can simulate altered ad distribution and ad delivery schedules needed to accommodate new campaigns while also ensuring that promised ad deliveries associated with existing campaigns are honored. Adjustment key 220 summarizes adjustments 246 made via interaction with knobs 244.

On other dates within date range 242, adjustments 246 can happen automatically, to indicate adjustments done by the system 100. In an embodiment, once sales personnel 116 move a knob 244, system 100 will not change its position by automatic adjustment.

Exemplary algorithms and used to generate the graphs of user interface 200 are described below with reference to the embodiments shown in FIGS. 1 and 2.

Ad Delivery Indicator

In certain embodiments, a delivery indicator (DI) for an ad is an indicator for checking if the ad's delivery is on track or not. In one embodiment, a DI can be formulated as ratio of fraction of budget spent to a fraction of time spent. This is represented in the equation below:

$$DI(d) = \left(\frac{\text{ad Budget Spent}(d)}{\text{Total ad Budget}} \bigg/ \frac{\text{Time Spent}(d)}{\text{Flight Duration}}\right) * 100$$

Where ad Budget Spent (d) equals the budget spent until the end of the day before day d by an ad and Time Spent (d) equals the time spent until the end of the day before day d (i.e., the day preceding d).

DI seeks to achieve substantially even delivery of ad, so that a daily target of ad impressions is met appropriately. That is, at any time, DI tries to adjust its value closer to 100.

According to embodiments, DI can be used in ad delivery as described below. In certain embodiments, each ad in the system 100 has a certain priority associated with it. The priority can be stored, for example, as metadata in ads data store 122 or within ad database hosted by ad server 112.

Ad server 112 is configured to deliver ads 135 for available impressions based on various rules, including, for example targeting rules, and when multiple ads qualify according to those rules, ad server 112 serves the highest priority ad among them. Ad server 112 can be configured to use the exemplary Delivery Indicator (DI) described above to boost the priority of ads as per their DI values. This adjustment can be achieved through a quantity called micro priority adjustment (MPA). An exemplary equation for calculating an MPA value is provided below:

$$MPA(d) = \begin{cases} 10 - (int)\left(\frac{DI(d)}{10}\right), & \forall\ 0 \le DI(d) < 100 \\ 0, & DI(d) \ge 100 \end{cases}$$

Where the effective priority of an ad on day d equals the priority of the ad+k*MPA(d).

Exemplary algorithms for making ad delivery indicators (DIs) forecast-aware are described below with reference to the exemplary system 100 shown in FIG. 1. When an ad (i.e., ad 135 shown in FIG. 1) comes into system 100, it can have properties including a flight duration (FD) and total targeted impressions (TI). Embodiments seek to achieve uniform distribution, per day, of ad delivery across the flight duration of the ad 135 by upper bounding DI by 100 in order to compute the delivery target for each day of date range 242 so that system 100 delivers no more and no less than that target. This target can be conceptualized as TI/FD ad impressions 240. A potential issue with this scheme is that it assumes uniform availability of inventory across the flight duration and may not take into consideration, the fact that there may be insufficient inventory on some future dates in the flight duration, therefore, an exemplary ad delivery algorithm can make use of excess inventory (i.e., unsold ad inventory if available) on current dates within date range 242 to compensate for insufficient inventory on future dates as per the forecast. This can be accomplished using the algorithm described below.

Making DI Forecast-Aware

A Delivery Indicator (DI) of an ad 135 for a day d can be adjusted to make use of surplus ad inventory on certain days as computed using an inventory forecast. In one embodiment, this can be formulated using the equation: DI'(d)=DI(D)*w(d), where:

$$w(d) = \frac{1}{1 + di_{frac}(d)}$$

$$di_{frac}(d) = \frac{\text{ad inventory surplus on day } d \times \left(\frac{\text{total ad budget shortage}}{\text{total ad inventory surplus}}\right)}{\text{ad budget spent on day } d}$$

$$\text{total ad inventory surplus} = \sum_{d=\text{start flight date}}^{\text{end flight date}} \text{ad inventory surplus on day } d$$

$$\text{total ad budget spent} = \sum_{d=\text{start flight date}}^{\text{end flight date}} \text{ad spend on day } d$$

total ad budget shortage = total ad budget − total ad budget spent (if even delivery algorithm was used)

An exemplary technique for incorporating a delivery indicator (DI) into an ad server, such as, for example, ad server 112 shown in FIG. 1, is described below.

Incorporating DI in an Ad Delivery Server

An ad server such as ad server 112 can make use of an adjusted DI to deliver its ads 135 during a day. In this way, ad server 112 optimizes the delivery of ads making use of information available through ad delivery and ad inventory forecasting. For example, by using the above described forecast-aware DI, if ad server 112 needs to deliver more ad impressions 240 during a day within date range 242 than the usual TI/FD impressions in order to compensate for a forecasted shortfall in future, ad server 112 gets w(d)<1. In certain embodiments, an IMS, such as the exemplary IMS 120 shown in FIG. 1, can use DIs. An example algorithm for using a DI in an IMS can be expressed as:

$$\text{Effective ad budget spent on day } d = \text{ad budget spent on day } d +$$
$$\text{ad inventory surplus on day } d \times \left(\frac{\text{total ad budget shortage}}{\text{total ad inventory surplus}}\right)$$

By using the above equation, an ad inventory record (i.e., a record in inventory data store 124 and/or ads data store 122) can be updated to use the calculated Effective ad budget spent on day d value instead of a previously used ad budget spent on day d value.

FIG. 3 illustrates an exemplary administrator user interface graphing levels of available inventory that the delivery distribution of an ad makes use of. In particular, FIG. 3 illustrates various levels in available inventory that the delivery distribution of an ad 135 can make use of. As shown in FIG. 3, ad inventory user interface (UI) 300 graphically depicts an adjustable impression range 340, total inventory available 352, a maximum impressions constraint 354, a minimum impressions constraint 356, an actual delivery using surplus 358, and an even delivery guideline 360. These constraints and ranges can be adjusted, for example, by an administrator of system 100 in response to effectuate settings changes.

FIG. 3 demonstrates various levels in available inventory that the delivery distribution of an ad makes use of. Window 362 of ad inventory UI 300 depicts a scenario when total inventory available 352 for an ad on a given day is more than the maximum allowable impressions constraint 354 as per contract that can be delivered for this ad on that day.

Window 364 shows the corresponding ranges in a case when total available inventory 352 for the ad on a day is less than the maximum allowable impressions 354. There can be days when the total available inventory 352 is less than the even delivery guideline 360, which represents a shortage of delivery for such days. In an embodiment, when there is such a shortage of delivery, ad delivery can be compensated by utilizing surplus available inventory on some other days (see actual delivery using surplus 358).

An exemplary method for performing adjustments 246 to move knobs 244 is described below with reference to FIGS. 2 and 3.

When a knob 244 is moved down by a certain amount on some dates with date range 242 (see, e.g., adjustments 246 on February 5 and February 6 in FIG. 2), it indicates that inventory needs to be freed up to accommodate a new campaign delivery on those dates. Next, the extra inventory that is needed on these dates is marked as additional shortfall in the available inventory for all the competing ads (i.e., ads 135 in system 100 that were using up the relevant inventory on those dates). At this point, the allowed limits of variation in the inventory used up by each ad 135 can be determined based on the adjustable impressions range 340 for that ad 135 as shown in FIG. 3.

Next, the assuming the total inventory available 352 is currently used up on a date of concern within date range 242, i.e., $M_d$, an embodiment sets the amount of inventory occupied by an ad 135 on that day to be $A_d$ and sets the total inventory required to reclaim on that day to meet the needs of the new campaign to be $C_d$. Then, the amount of inventory that needs to be reclaimed from an ad 135 can be computed as: $CA_d = A_d/M_d * C_d$ If $A_d - CA_d$ is within an adjustable impressions range 340 as shown in FIG. 3 for each ad 135, it is determined that the adjustment is feasible and the new campaign can be accommodated. Otherwise, a total shortfall introduced for an ad 135 as a result of adjustments on all required dates within date range 242 can be calculated as: $\Sigma_D(A_d - CA_d)$ where D is all dates on which adjustment was done.

To account for additional shortage accumulated as a result of total shortfall introduced for an ad 135 (i.e., the shortfall calculated using equation $\Sigma_D(A_d - CA_d)$ above), for each ad 135, an embodiment can claim some inventory from the surplus inventory available on all other days of the flight duration of the ad 135. This can be accomplished using the equation $CA_d = A_d/M_d * C_d$ and plugging in the total ad inventory shortage determined using equation $\Sigma_D(A_d - CA_d)$ and total ad inventory surplus calculated using the surplus on all other dates besides dates in D. In certain embodiments, the flight duration of ad 135 can overlap or comprise date range 242. This step gives the Effective ad budget spent on day d for each ad 135 on all other days where extra impressions need to be redistributed. Embodiments can use this to compute final ad delivery graphs for simulations, such as the exemplary graphs 248, 250, and 252 depicted in ad delivery interface 200.

According to embodiments, after a deal is finalized (i.e., between sales personnel 116 and advertiser 118, the above-listed equations used for making a DI Forecast-aware can be used to compute new a new DI'(d) for each day of each competing ad, by using the values of new total shortage and total surplus for each competing ad. This DI'(d) value can then be communicated to ad server 112 so that it can adjust its actual delivery (i.e., to be performed by ad player 114) immediately to conform to a new delivery plan to accommodate the new campaign(s).

Video Advertising System

Figure 4:
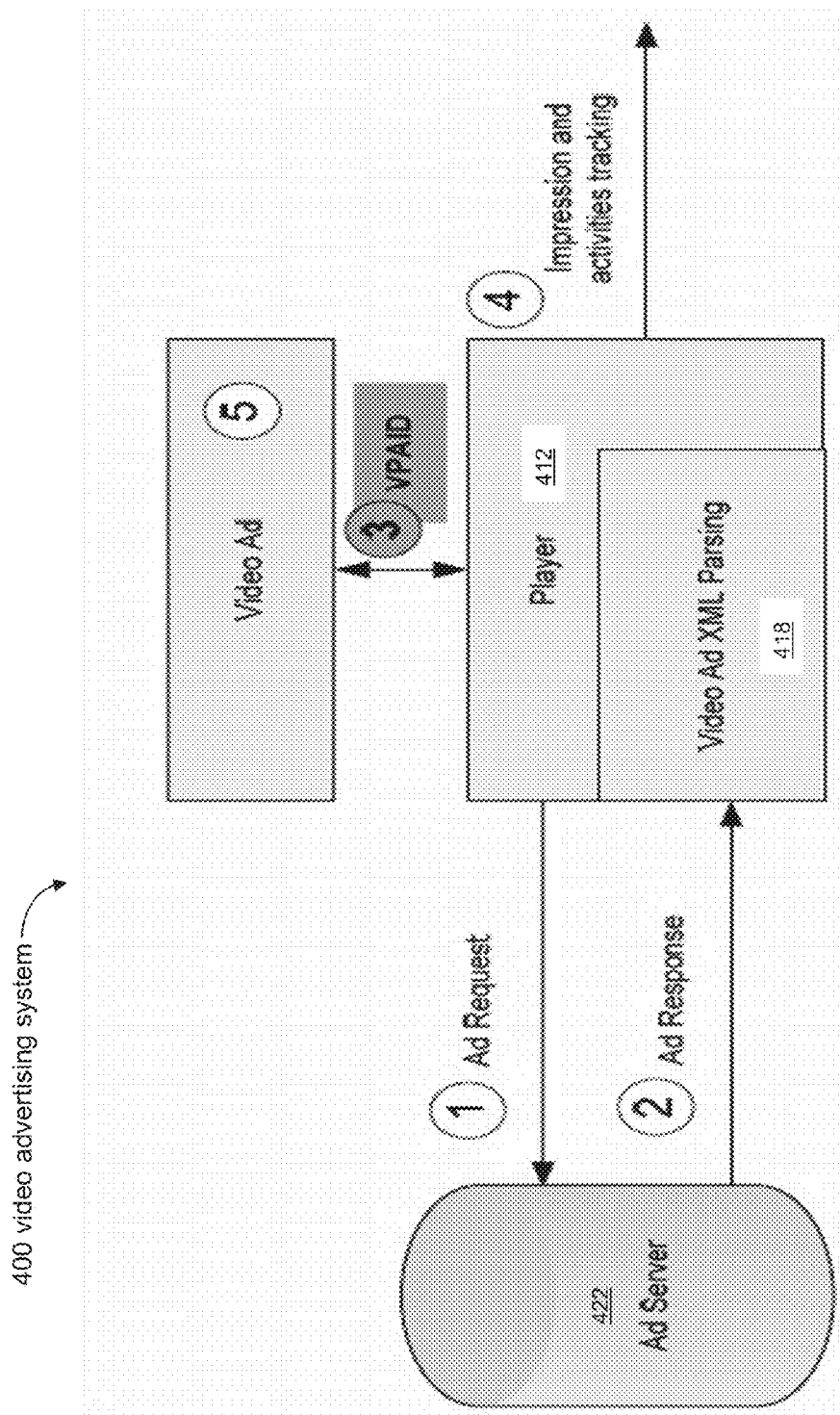
FIG. 4 is a block diagram illustrating communications flows between components of a prior art system for processing in-stream video advertisements displayed in a digital video player.

FIG. 4 illustrates communications flows between components of a prior art system for processing in-stream video advertisements displayed in digital video players. In particular, FIG. 4 depicts a video advertising system 400 that implements pre-defined standards for playing advertisements inside a video player 412 along with certain video content. FIG. 4 shows that at least five enumerated steps are required for video advertisement (ad') flows in video advertising system 400. As described below, video advertising system 400 also requires multiple interface points as part of the communication flow for video advertising system 400 merely provides a standard compliant video advertisement server 422. Advantages of ad delivery and inventory management system 100 include providing the forecast-based, partially and fully automated ad delivery and inventory management features discussed above with reference to FIGS. 1-3 without requiring the steps and multiple interface points required by video advertising system 400.

Video advertising system 400 requires protocols that make it possible to show both a video and separate advertisement media inside video player 412. FIG. 4 illustrates how video advertising system 400 is implemented using such protocols. Other advantages of ad delivery and inventory management system 100 include the ability to provide a tool (see, e.g., FIG. 2) for forecast-based adjustment of ad delivery and ad space inventory management. In this way, embodiments disclosed herein can deliver ads to be included in video content without requiring protocols such as those used in video advertising system 400.

As shown in FIG. 4, in video advertising system 400, the flow for delivering placing a video advertisement requires several steps and interfaces. In step 1, a video player 412 submits an advertisement request by making an advertisement call to advertisement server 422. Then, in step 4, advertisement server 422 responds with an Extensible Markup Language (XML) file including a reference to an advertisement, and a video advertisement XML parsing module 418 parses the XML file to retrieve the reference to the advertisement. Step 4 and other steps shown in FIG. 4 do not incorporate results of any calculations regarding where to place an advertisement. In contrast to video advertising system 400, another advantage of ad delivery and inventory management system 100 is that calculations can be used to automatically determine unobtrusive locations to place an ad. Next, in step 3, video player 412 retrieves advertisement media referred to in the XML file and renders the advertisement media. According to video advertising system 400, displaying advertisement media typically requires a set of parameters from video player 412, which can require interaction between the video advertisement XML parsing module 418 and video player 412 using an application programming interface (API). In video advertising system 400, an API is required for any pre-roll advertisement media that runs a script or any interactive, clickable advertisement media. In step 4, video player 412 fires impression and activity reporting beacons. Lastly, in step 5, the advertisement media is rendered.

In video advertising system 400, a protocol between video player 412 and the advertisement is required. The protocol includes methods that the advertisement must implement, and video player 412 must call the methods when certain events occur. Examples of such methods are resizeAd, startAd, stopAd, pauseAd, resumeAd, collapseAd, expandAd. In video advertising system 400, an advertisement can only implement special behavior, such as resizing, when a method is explicitly called. For example, when the screen size on which an advertisement appears changes, an advertisement can dynamically choose its layout depending on the available area by implementing this functionality in the resizeAd method. Other advantages of ad delivery and inventory management system 100 and method 500 described below with reference to FIG. 5 is the ad delivery and inventory management system and method do not require the protocol or method calls needed in video advertising system 400.

Exemplary Method

Figure 5:
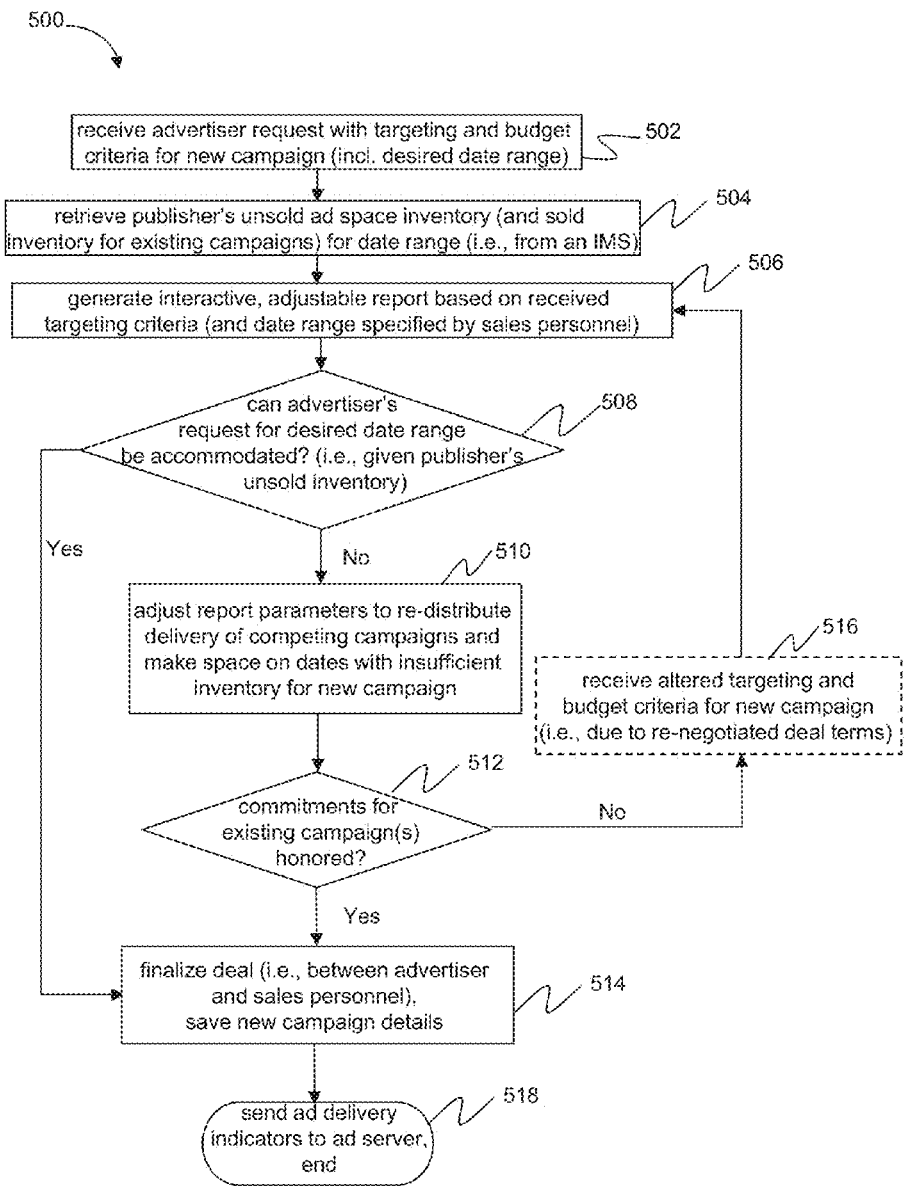
FIG. 5 is a flow chart illustrating an example method for managing ad delivery and ad inventory, in accordance with various embodiments.

FIG. 5 is a flow chart illustrating an example method 500 for forecast-based ad delivery and inventory management. For illustrative purposes, the method 500 is described with reference to the system and UI implementations described above with reference to FIGS. 1-3. Other implementations, however, are possible. Optional and/or additional portions of steps are indicated in the flowchart by parenthetical phrases (see, e.g., steps 502, 504, 506, 508, 514 and 516).

The method begins in step 502 when an advertiser request is received with targeting and budget criteria for a new campaign. As shown, the targeting criteria can include a desired date range, which can comprise a flight duration for ads 135 included in the new campaign. Step 502 can be performed after an advertiser 118 specifies their request in terms of targeting criteria and budget criteria to a sales person 116 representing a publisher of video content. The targeting criteria received in step 502 can include campaign-related criteria such as, for example, a targeted region, a targeted audience segment, a minimum number of impressions, a date range associated with a campaign, and other campaign-related criteria. The budget criteria can include, but is not limited to, cost per mille/thousand impressions (CPM), cost per click (CPC), and other budget criteria. After the advertiser request is received, control is passed to step 504.

Next, in step 504, the publisher's unsold and sold ad space inventory for one or more existing campaigns spanning a date range is retrieved. As shown in FIG. 5, this step can be performed by retrieving unsold and sold ad space inventory from an IMS such as IMS 120. For example, the unsold and sold ad space inventory can be retrieved from ads data store 122 and ad space inventory data store 124 of IMS 120. After the unsold and sold ad space inventory has been retrieved, control is passed to step 506.

In step 506, an interactive, adjustable report is generated based on the requested targeting criteria received in step 502 and a date range. As shown, step 506 can be performed using a date range requested or specified by sales personnel 116. For example, step 506 can be performed in response to input received from a sales person 116 from an IMS 120 for a desired date range associated with the advertiser's request received in step 502 and the requested targeting criteria, such as a minimum number of impressions set by the advertiser 118. An example of such a report is described above with reference to FIG. 2 wherein displayed values are adjustable by sales personnel 116 to accommodate the new campaign from advertiser 118. Step 506 can be performed by forecasting and reporting module 126 of IMS 120. After the forecasting-based ads delivery report has been generated, control is passed to step 508.

In step 508 a determination is made, based on the adjustable report generated in step 506, if request from advertiser 118 for the desired date range indicated in step 502 can be accommodated, given the publisher's unsold inventory. In an embodiment, step 508 can be performed by sales personnel 116 using IMS 120 to simulate a modified distribution of ads reflecting changes by sales personnel 116 in the adjustable report. If it determined that the campaign goals for the new campaign can be met, control is passed to step 514. Otherwise if the campaign goals cannot be straight away, control is passed to step 510.

In step 510, values are adjusted in the report in an attempt to accommodate the goals of a new campaign. In one embodiment, this step can be performed by receiving input from a sales person 116 via the interactive report generated in step 506. For example, by turning the virtual knobs 244 shown in FIG. 2, a sales person 116 can adjust temporal parameters such as, for example, a week, hour, or day. These adjustments re-distribute delivery of competing campaigns (i.e., campaigns overlapping in time) in system 100, and make more space available on dates with insufficient inventory so that the new campaign can be accommodated. Step 510 can be performed using the exemplary algorithms and equations for adjustments and ad delivery redistribution triggered by such adjustments described above with reference to FIGS. 2 and 3 and the example user interface (UI) displaying a dynamic report usable to dynamically adjust ad delivery plans shown in FIG. 2. After the report parameters have been adjusted and ad delivery has been redistributed, control is passed to step 512.

In step 512, a determination is made as to whether commitments related to existing campaigns can be honored using the redistributed ad delivery produced by step 510. By performing step 512 based on the redistribution resulting from step 510, method 500 can ensure that commitments for existing campaigns are honored as new, partially overlapping campaigns are accommodated. In one embodiment, step 512 can comprise a sales person 116 examining the dynamic report after adjustments from step 508 to determine if the new campaign can actually be accommodated in view of the adjustments and the commitments related to existing campaigns. If it determined that the commitments for existing campaigns can be honored, control is passed to step 514. That is, if it is determined in step 512, as a result of the adjustments and re-distribution performed in step 510, that the new campaign can be accommodated, control is passed to step 514 so that a deal can be finalized between the sales person 116 and advertiser 118. Otherwise, control is passed back to step 506 (optionally via intervening step 516).

In optional step 516, altered targeting and budget criteria for the new campaign are received. As seen in FIG. 5, this step can be performed due to re-negotiated deal terms resulting from new negotiations 127 between advertiser 118 and sales personnel 116. According to certain embodiments, if it is determined, after repeating steps 506-512, that the new campaign cannot be accommodated even after adjustments 246 performed via the dynamic report (i.e., moving the knobs 244 of FIG. 2 all the way to upper or lower limits) due to there being insufficient unsold ad space inventory available in system 100, step 516 can be performed so that terms of the deal can be re-negotiated between sales personnel 116 and advertiser 118 in light of what portion(s) of the targeting and budget criteria can be accommodated. After the modified targeting and budget criteria for the new campaign are received, control is passed back to step 506.

In step 514 a deal is finalized and an agreement is made (i.e., the sales person 116 and advertiser 118 strike a deal resulting per negotiations 127) to book/place the ads 135 associated with the new campaign. In this step, the new campaign details are saved. In step 514, booked ads 135 can also be indicated as sold ad inventory in IMS 120. This step results in a deal struck between a sales person 116 and advertiser 118. At this point, the new campaign is committed and saved in the system (i.e., the sold ad inventory is indicated in IMS 120) and control is passed to step 518.

Next, in step 518, delivery indicators (DIs) are sent to ad server 112 so it can immediately start adjusting its ad delivery to conform to the new delivery plan. FIG. 2 provides an exemplary UI including simulation graphs indicating adjusted ad delivery conforming to a new ad delivery plan.

Exemplary Computer System Implementation

Figure 6:
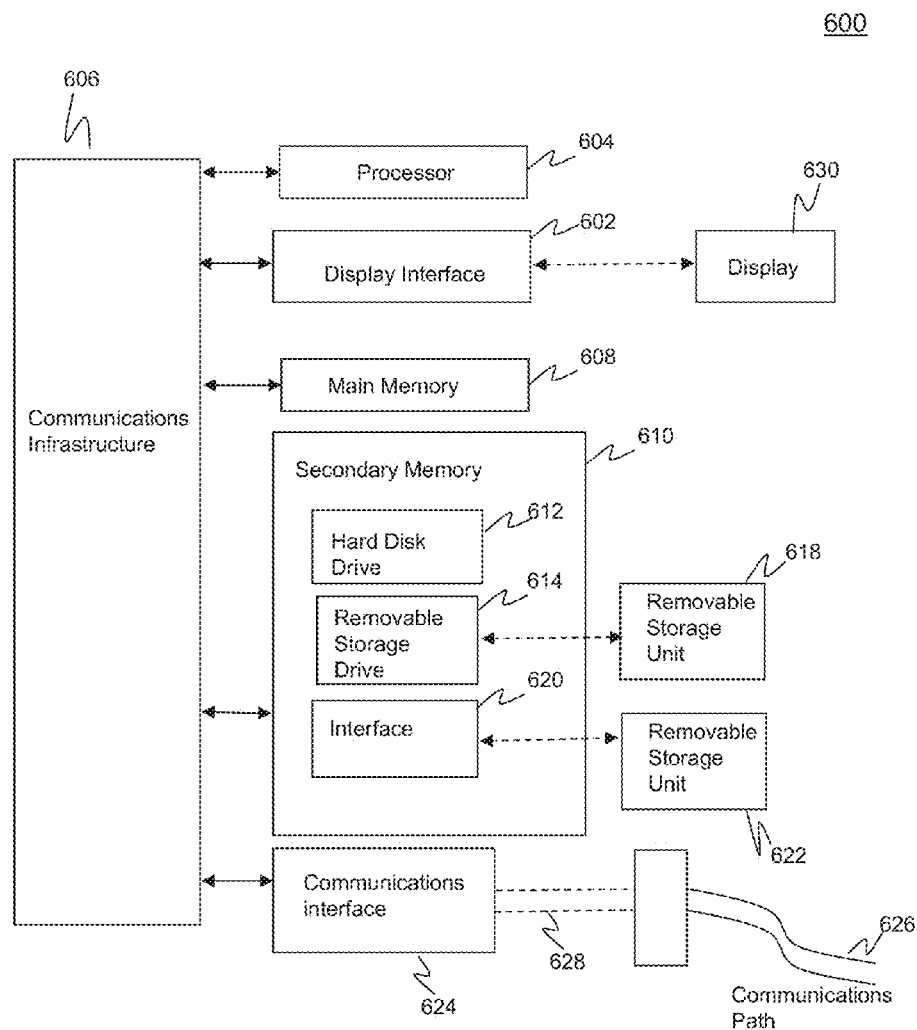
FIG. 6 is a diagram of an exemplary computer system in which various embodiments of the present disclosure can be implemented.

Although exemplary embodiments have been described in terms of systems, and methods, it is contemplated that certain functionality described herein may be implemented in software on microprocessors, such as processors 115 of ad server 112 and processor 125 of IMS 120 shown in FIG. 1, and computing devices such as the computer system 600 illustrated in FIG. 6. In various embodiments, one or more of the functions of the various components may be implemented in software that controls a computing device, such as computer system 600, which is described below with reference to FIG. 6.

Aspects of the present invention shown in FIGS. 1-5, or any part(s) or function(s) thereof, may be implemented using hardware, software modules, firmware, tangible computer readable media having logic or instructions stored thereon, or a combination thereof and may be implemented in one or more computer systems or other processing systems.

FIG. 6 illustrates an example computer system 600 in which embodiments of the present invention, or portions thereof, may be implemented as computer-readable instructions or code. For example, some functionality performed by client device 138, IMS 120, and ad server 112 shown in FIG. 1, can be implemented in the computer system 600 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the method 500 illustrated by the flowchart of FIG. 5 discussed above and the user interfaces 200 and 300 discussed above with reference to FIGS. 2 and 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme. In certain embodiments, one or more of the processors 115, 125 and 142 described above with reference to ad server 112, inventory management system 120, and client device 138 of FIG. 1 can be embodied as the processor device 604 shown in FIG. 6.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a magnetic tape drive, an optical disk drive, a flash memory, or the like. In non-limiting embodiments, one or more of the memories 123, 113, and 144 described above with reference to IMS 120, ad server 112 and client device 138 of FIG. 1 can be embodied as the main memory 608 shown in FIG. 6.

The removable storage drive 614 reads from and/or writes to a removable storage unit 618 in a well-known manner. Removable storage unit 618 may comprise a magnetic tape, optical disk, etc. which is read by and written to by removable storage drive 614. As will be appreciated by persons skilled in the relevant art, removable storage unit 618 includes a non-transitory computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600. In non-limiting embodiments, one or more of the memories 113, 123 and 144 described above with reference to ad server 112, IMS 120, and client device 138 of FIG. 1 can be embodied as the main memory 608 shown in FIG. 6.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data 628 transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 608 and secondary memory 610, which can be memory semiconductors (e.g., DRAMs, etc.). Computer readable medium and non-transitory computer readable medium can also refer to removable storage unit 618, removable storage unit 622, and a hard disk installed in hard disk drive 612. Signals carried over communications path 626 can also embody the logic described herein. These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the steps in the method 500 illustrated by the flowchart of FIG. 5, discussed above. Accordingly, such computer programs represent controllers of the computer system 600. Where an embodiment of the invention is implemented using software, the software may be stored in a computer program product and loaded into computer system 600 using removable storage drive 614, interface 620, and hard disk drive 612, or communications interface 624.

In an embodiment, the display device 121 used to display an interface of video player 140, and/or UIs 200 or 300, may be a computer display 630 shown in FIG. 6. The computer display 630 of computer system 600 can be implemented as a touch sensitive display (i.e., a touch screen). Similarly, the user interfaces shown in FIGS. 8 and 4 may be embodied as a display interface 602 shown in FIG. 6.

Embodiments of the invention also may be directed to computer program products comprising software stored on any computer readable medium. Such software, when executed in one or more data processing device, causes a data processing device(s) to operate as described herein. Embodiments employ any computer readable medium. Examples of computer useable mediums include, but are not limited to, primary storage devices (e.g., any type of random access memory), secondary storage devices (e.g., hard drives, floppy disks, CD ROMS, DVDs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method for managing online ad delivery and online ad inventory, the method comprising:

receiving, at an inventory management system, campaign criteria for an online advertising campaign, the campaign criteria including a desired date range and a minimum number of impressions;

retrieving, by the inventory management system, indications of unsold ad space inventory;

in response to determining, based at least in part on the unsold ad space inventory corresponding to the desired date range, that the campaign criteria cannot be satisfied:

rendering, in a user interface displayed on a display device of the inventory management system, an interactive ad delivery and distribution report, the report indicating:

forecasted ad distribution and ad delivery for at least part of the desired date range during which the campaign criteria cannot be satisfied, a first number of ad impressions for a first time increment included in the desired date range, the report including selectable controls configured to receive input to adjust first parameters corresponding to, for the first time increment, first minimum number of ad impressions and a first maximum number of ad impressions, and a second number of ad impressions for a second time increment included in the desired date range, the report including selectable controls configured to receive input to adjust second parameters corresponding to, for the second time increment, a second minimum number of ad impressions and a second maximum number of ad impressions such that (i) the first minimum number of ad impressions and the first maximum number of ad impressions are different from (ii) the second minimum number of ad impressions and the second maximum number of ad impressions, wherein a total number of ad impressions for the desired date range constrains adjustments to the first minimum number of ad impressions, the first maximum number of ad impressions, the second minimum number of ad impressions, and the second maximum number of ad impressions; and automatically redistributing ad delivery by adjusting an ad delivery plan based on adjusted report parameters received via the user interface.

2. The method of claim 1, wherein:
the retrieving comprises retrieving sold ad space inventory associated with one or more existing campaigns;
the determining is based at least in part on the sold ad space inventory associated with the one or more existing campaigns; and
the report indicates the unsold ad space inventory and the sold ad space inventory.

3. The method of claim 1, further comprising:
in response to determining that the campaign criteria can be satisfied:
saving information regarding the campaign at the inventory management system, the information including at least an ad delivery schedule and ad delivery indicators for ads associated with the campaign; and
sending the ad delivery indicators to an advertising server.

4. The method of claim 1, further comprising, prior to the determining:
forecasting future ad distribution and unsold ad space inventory based on ad delivery indicators associated with one or more existing campaigns.

5. The method of claim 1, further comprising:
repeating the rendering and the redistributing until the determining determines that the campaign criteria can be satisfied.

6. The method of claim 1, wherein the campaign includes indications of a plurality of ads to be placed in video content, each of the plurality of ads being an item of electronic content including one or more of text, image, multimedia, and hypervideo content.

7. The method of claim 1, wherein:
the receiving comprises receiving the campaign criteria from an advertiser; and
the campaign criteria comprises:
targeting criteria indicating one or more of a flight duration, a minimum number of impressions, desired video content properties, desired audience segments, and desired geographic regions; and
budgeting criteria indicating one or more of a total number of impressions for advertisements associated with the campaign, a cost per thousand impressions (CPM), and a total campaign budget.

8. The method of claim 1, wherein the retrieving comprises:
retrieving the unsold ad space inventory from the inventory management system (IMS), the IMS being associated with a publisher of video content; and
the unsold ad space inventory overlaps at least partially with the desired date range.

9. An inventory management system comprising:
an input device;
a display device;
a processor; and
a memory having instructions stored thereon that, if executed by the processor, cause the processor to perform operations for managing online ad delivery and online ad inventory, the operations comprising:
receiving campaign criteria for an online advertising campaign, the campaign criteria including a desired date range and a minimum number of impressions;
retrieving indications of unsold ad space inventory;
in response to determining, based at least in part on the unsold ad space inventory corresponding to the desired date range, that the campaign criteria cannot be satisfied:
rendering, in a user interface on the display device, an interactive ad delivery and distribution report, the report indicating:
forecasted ad distribution and ad delivery for at least part of the desired date range during which the campaign criteria cannot be satisfied,
a first number of ad impressions for a first time increment included in the desired date range, the report including selectable controls configured to receive input to adjust first parameters corresponding to, for the first time increment, a first minimum number of ad impressions and a first maximum number of ad impressions, and
a second number of ad impressions for a second time increment included in the desired date range, the report including selectable controls configured to receive input to adjust second parameters corresponding to, for the second time increment, second minimum number of ad impressions and a second maximum number of ad impressions such that (i) the first minimum number of ad impressions and the first maximum number ad impressions are different from (ii) the second minimum number of ad impressions and the second maximum number of ad impressions,
wherein a total number of ad impressions for the desired date range constrains adjustments to the first minimum number of ad impressions, the first maximum number of ad impressions, the second minimum number of ad impressions, and the second maximum number of ad impressions; and
automatically redistributing ad delivery by adjusting an ad delivery plan based on adjusted report parameters received via the user interface.

10. The system of claim 9, wherein:
the retrieving comprises retrieving sold ad space inventory associated with one or more existing campaigns;
the determining is based at least in part on the sold ad space inventory associated with the one or more existing campaigns; and
the report indicates the unsold ad space inventory and the sold ad space inventory.

11. The system of claim 10, wherein the retrieving comprises:
retrieving the unsold and sold ad space inventory from an inventory management system (IMS) associated with a publisher of video content; and
the unsold and sold ad space inventory overlaps at least partially with the desired date range.

12. The system of claim 9, the operations further comprising:

in response to determining that the campaign criteria can be satisfied:
storing information regarding the campaign in the memory, the information including at least an ad delivery schedule and ad delivery indicators for ads associated with the campaign; and
sending the ad delivery indicators to an advertising server.

13. The system of claim 9, wherein:
the receiving comprises receiving the campaign criteria from an advertiser; and
the campaign criteria comprises:
targeting criteria indicating one or more of a flight duration, a minimum number of impressions, desired video content properties, desired audience segments, and desired geographic regions; and
budgeting criteria indicating one or more of a total number of impressions for advertisements associated with the campaign, a cost per thousand impressions (CPM), and a total campaign budget.

14. A non-transitory computer readable storage medium having executable instructions stored thereon, that, if executed by an inventory management system a, cause the inventory management system to perform operations for managing online ad delivery and online ad inventory, the instructions comprising:
instructions for receiving campaign criteria for an online advertising campaign, the campaign criteria including a desired date range and a minimum number of impressions
instructions for retrieving indications of unsold ad space inventory and sold ad space inventory associated with one or more existing campaigns;
in response to determining, based at least in part on the unsold and sold ad space inventory corresponding to the desired date range, that the campaign criteria cannot be satisfied, instructions for:
rendering, in a user interface, an interactive ad delivery and distribution report, the report indicating:
forecasted ad distribution and ad delivery for at least part of the desired date range during which the campaign criteria cannot be satisfied,
a first number of ad impressions for a first time increment included in the desired date range, the report including selectable controls configured to receive input to adjust first parameters corresponding to, for the first time increment, a first minimum number of ad impressions and a first maximum number of ad impressions, and
a second number of ad impressions for a second time increment included in the desired date range, the report including selectable controls configured to receive input to adjust second parameters corresponding to, for the second time increment, a second minimum number of ad impressions and a second maximum number of ad impressions such that (i) the first minimum number of ad impressions and the first maximum number of ad impressions are different from (ii) the second minimum number of ad impressions and the second maximum number of ad impressions,
wherein a total number of ad impressions for the desired date range constrains adjustments to the first minimum number of ad impressions, the first maximum number of ad impressions, the second minimum number of ad impressions, and the second maximum number of ad impressions; and
instructions for automatically redistributing ad delivery by adjusting an ad delivery plan based on adjusted report parameters received via the user interface so as to accommodate the new advertising campaign.

15. The computer readable storage medium of claim 14, the instructions further comprising:
in response to determining that the campaign criteria can be satisfied, instructions for:
storing information regarding the new advertising campaign in the computer readable storage medium, the information including at least an ad delivery schedule and ad delivery indicators for ads associated with the new advertising campaign; and
sending the ad delivery indicators to an advertising server.

16. The computer readable storage medium of claim 14, wherein:
the receiving comprises receiving the campaign criteria from an advertiser; and
the campaign criteria comprises:
targeting criteria indicating one or more of a flight duration, a minimum number of impressions, desired video content properties, desired audience segments, and a desired geographic region; and
budgeting criteria indicating one or more of a total number of impressions for advertisements associated with the new advertising campaign, a cost per thousand impressions (CPM), and a total campaign budget.

* * * * *